(12) United States Patent
Goldwitz

(10) Patent No.: US 12,384,438 B2
(45) Date of Patent: Aug. 12, 2025

(54) FOLDABLE DOOR CART

(71) Applicant: Brian Goldwitz, Waterbury, CT (US)

(72) Inventor: Brian Goldwitz, Waterbury, CT (US)

( * ) Notice: Subject to any disclaimer, the term of this patent is extended or adjusted under 35 U.S.C. 154(b) by 180 days.

(21) Appl. No.: 17/952,184

(22) Filed: Sep. 23, 2022

(65) Prior Publication Data

US 2023/0088256 A1  Mar. 23, 2023

Related U.S. Application Data

(60) Provisional application No. 63/247,795, filed on Sep. 23, 2021.

(51) Int. Cl.
*B62B 3/02* (2006.01)
*B62B 1/12* (2006.01)
*B62B 1/26* (2006.01)

(52) U.S. Cl.
CPC .............. *B62B 1/268* (2013.01); *B62B 1/12* (2013.01)

(58) Field of Classification Search
CPC .. B62B 1/268; B62B 1/12; B62B 1/00; B62B 1/26; B62B 1/04; B62B 1/042; B62B 3/108; B62B 3/02; B62B 3/00; B62B 3/10
See application file for complete search history.

(56) References Cited

U.S. PATENT DOCUMENTS

| | | | | |
|---|---|---|---|---|
| 2,418,586 A * | 4/1947 | Jenkins | ................... | B62B 3/108 187/244 |
| 2,604,210 A * | 7/1952 | Thetford | ................. | B62B 1/268 280/47.35 |
| 2,967,627 A * | 1/1961 | Vinson | ...................... | B62B 3/02 254/2 R |
| 3,104,890 A * | 9/1963 | Hill | ........................... | B62B 1/12 280/47.27 |
| 3,643,935 A * | 2/1972 | Bell | ..................... | E04F 21/0023 269/84 |
| 3,804,432 A * | 4/1974 | Lehrman | ................... | B62B 1/12 280/654 |
| 4,050,671 A * | 9/1977 | Coleman | ................. | B62B 3/108 254/7 R |
| 4,505,495 A * | 3/1985 | Foss | .......................... | B62B 3/02 16/113.1 |
| 4,619,464 A * | 10/1986 | Hwang | ...................... | B62B 3/02 280/42 |
| 4,810,151 A * | 3/1989 | Shern | ................... | E04F 21/0023 414/11 |
| 4,813,701 A * | 3/1989 | Balland | ................... | B62B 3/027 D12/129 |
| 4,865,346 A * | 9/1989 | Carlile | ..................... | B62B 1/12 280/654 |
| 4,921,270 A * | 5/1990 | Schoberg | ................ | B62B 1/002 414/490 |

(Continued)

*Primary Examiner* — James M Dolak
(74) *Attorney, Agent, or Firm* — Furr Law Firm; Jeffrey M. Furr

(57) ABSTRACT

The current invention is a foldable door frame holder cart with a rounded support bar in the middle of a base holding a door frame. The base has a plurality of wheels in the preferred embodiment. The device has adjustable brackets which the hinges of the door frame fit into. The adjustable bracket such as a thumb-turn bracket which can be used to better secure the door frame to the device. The device without the door with door frame guides that extend up from the top of the base. The cart can carry multiple doors and can fold into a smaller shape for storage.

9 Claims, 20 Drawing Sheets

(56) References Cited

U.S. PATENT DOCUMENTS

Figure 1:
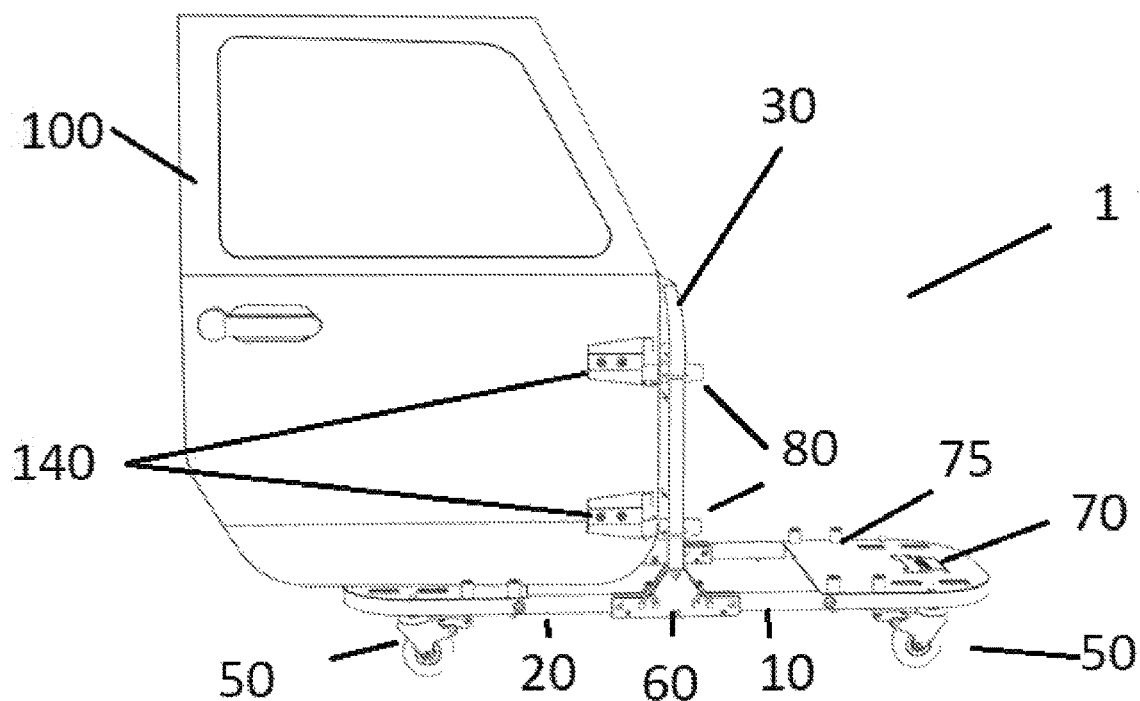

| | | | | |
|---|---|---|---|---|
| 4,932,639 A * | 6/1990 | Fjellstrom | B66F 3/08 | 269/71 |
| 4,978,132 A * | 12/1990 | Wilson | E04F 21/0023 | 280/47.131 |
| 5,040,809 A * | 8/1991 | Yang | B62B 3/02 | 280/42 |
| 5,135,205 A * | 8/1992 | Bedard | B66F 9/02 | 269/71 |
| 5,244,221 A * | 9/1993 | Ward | B62B 1/14 | 414/490 |
| 5,257,892 A * | 11/1993 | Branch | B62B 3/02 | 280/30 |
| 5,480,187 A * | 1/1996 | Binning | B62B 3/02 | 296/50 |
| 6,024,348 A * | 2/2000 | Ventura | B05B 13/0285 | 269/104 |
| 6,231,034 B1 * | 5/2001 | Walker | E04F 21/0023 | 269/901 |
| 6,505,844 B2 * | 1/2003 | Hallman | E04F 21/0023 | 118/500 |
| 7,008,165 B1 * | 3/2006 | Grimes | B66F 9/06 | 414/800 |
| 7,008,166 B1 * | 3/2006 | Grimes | B66C 23/48 | 254/114 |
| 7,175,168 B2 * | 2/2007 | Hardaker | B64F 5/50 | 29/430 |
| 7,419,170 B2 * | 9/2008 | Krizan | B62B 3/108 | 280/47.35 |
| 7,780,389 B1 * | 8/2010 | Young | B66F 19/00 | 414/11 |
| 7,784,802 B2 * | 8/2010 | White | B62B 3/108 | 280/47.41 |
| 7,854,444 B2 * | 12/2010 | Zhuang | B62B 3/02 | 280/651 |
| 8,042,829 B2 * | 10/2011 | Hailston | B62B 3/022 | 280/30 |
| 8,088,984 B2 * | 1/2012 | Meyer | G10G 7/005 | 84/421 |
| 8,820,773 B2 * | 9/2014 | Ferree, Jr. | B62B 3/02 | 280/47.27 |
| 9,371,655 B1 * | 6/2016 | Davis | E04F 21/0007 | |
| 10,160,467 B2 * | 12/2018 | Josephsen | B62B 1/12 | |
| 10,376,045 B1 * | 8/2019 | Poudrier | B62B 3/002 | |
| 10,471,980 B1 * | 11/2019 | Jordan | B62B 3/16 | |
| 10,981,588 B1 * | 4/2021 | Poudrier | B62B 3/02 | |
| 11,097,759 B1 * | 8/2021 | Poudrier | B62B 3/008 | |
| 11,161,536 B2 * | 11/2021 | Yu | B62B 3/108 | |
| 11,172,761 B2 * | 11/2021 | Van Zile, Jr. | A47B 43/00 | |
| 11,173,936 B1 * | 11/2021 | Regev | B62B 3/108 | |
| 11,192,566 B2 * | 12/2021 | Ceja | B62B 3/008 | |
| 11,390,309 B2 * | 7/2022 | Candelario | B62B 3/005 | |
| 11,613,288 B2 * | 3/2023 | Burns | B62B 5/00 | 211/2 |
| 11,654,947 B1 * | 5/2023 | Poudrier | B62B 3/008 | 211/13.1 |
| 11,718,334 B1 * | 8/2023 | Yao | B62B 3/10 | 280/47.35 |
| 12,275,447 B1 * | 4/2025 | Machado | B62B 5/0093 | |
| 12,319,330 B2 * | 6/2025 | Laible | B65G 1/14 | |
| 2019/0331291 A1 * | 10/2019 | Poudrier | F16M 11/22 | |

* cited by examiner

FOLDABLE DOOR CART

RELATED APPLICATIONS

This application is the non-provisional of provisional application 63/247,795 filed on Sep. 23, 2021 and claims its priority date.

TECHNICAL FIELD

The technology discussed below relates door carts and more particularly making it easier to remove, store and move the doors.

BACKGROUND

Many people who enjoy outdoor activities own sport utility vehicles (SUVs) with doors that can be removed in order to give occupants more outdoor pleasure while riding in the vehicle. The doors, once removed, need to be stored in appropriate fashion in order to prevent damage to them. As such doors are relatively bulky and heavy, such storage is not an easy task. Laying the doors on a ground surface is not satisfactory as that can cause damage to the door, especially to its finish. Therefore, some devices are available for storing the doors, but such devices do not offer any purpose beyond this singular purpose and are not otherwise of particular utility when not serving in their intended purpose and are they themselves relatively large and bulky.

What is needed is a device that is designed to easily and effectively hold a vehicle door or hard top that is removed from the vehicle so as to prevent the door or hard top from becoming damaged or removing the hard top for an open feeling. Such devices must be able to easily move about the ground level when the doors or hard top are being held by the devices. Such a device must have substantial utility beyond the task of holding and moving vehicle doors or hard top about so that the device is multipurpose in its functioning. Such a device must provide support for a variety of articles as defined by the users' needs and also be relatively small and compact when not in use for ease of storage or transport of the device.

There is still room for improvement in the art.

SUMMARY

The current invention is a new devices to hold removed doors from a jeep or SUV.

The current invention is a foldable door frame holder cart with a rounded support bar in the middle of a base holding a door frame. The base has a plurality of wheels in the preferred embodiment. The device has adjustable brackets which the hinges of the door frame fit into. The adjustable bracket such as a thumb-turn bracket which can be used to better secure the door frame to the device. The device has door frame guides that extend up from the top of the base.

These are improvements over the current art.

DRAWINGS

Figure 2:
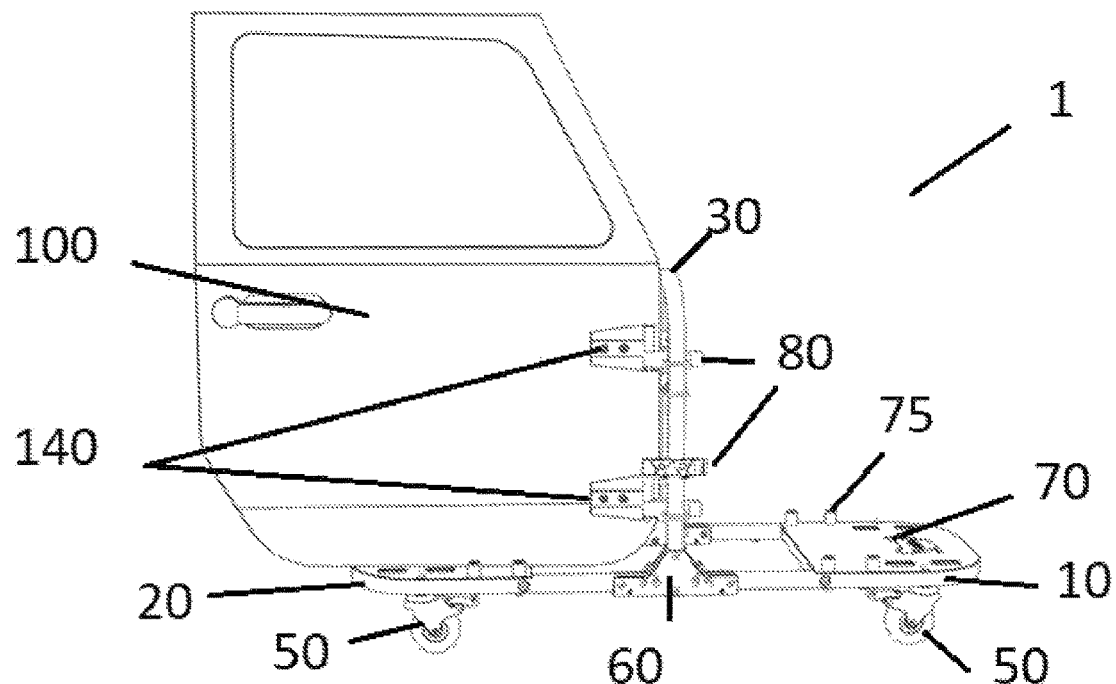
Figure 3:
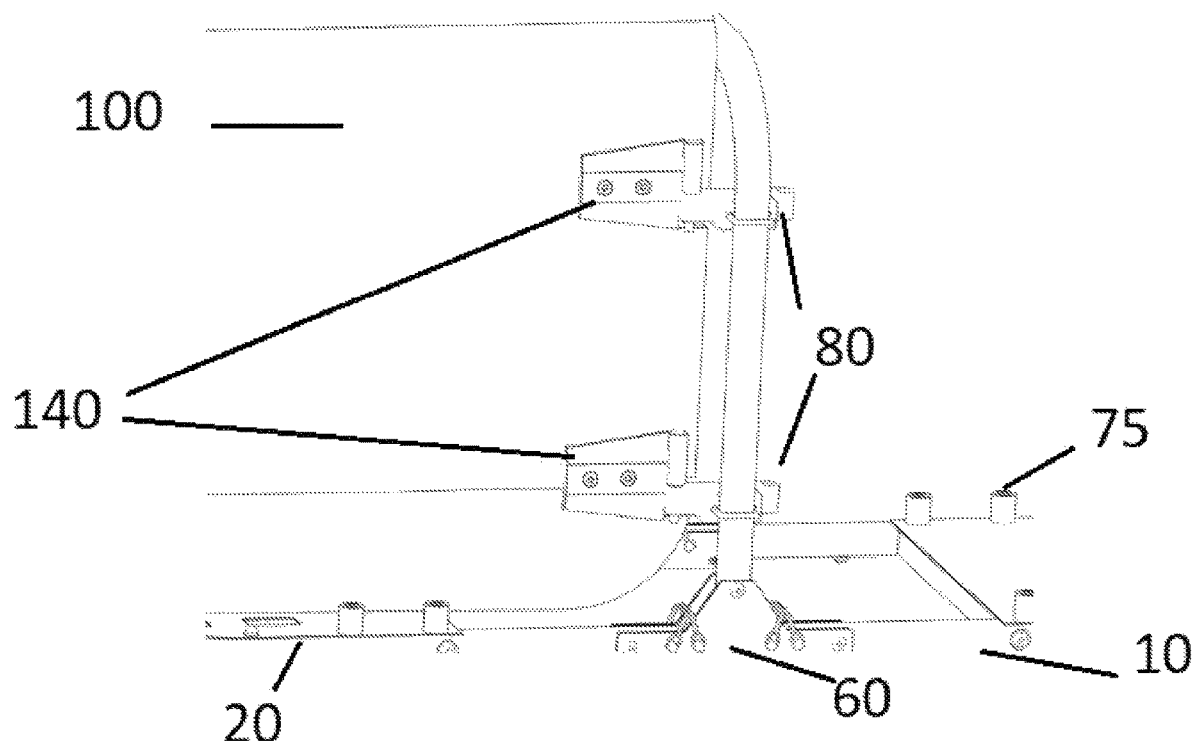
Figure 4:
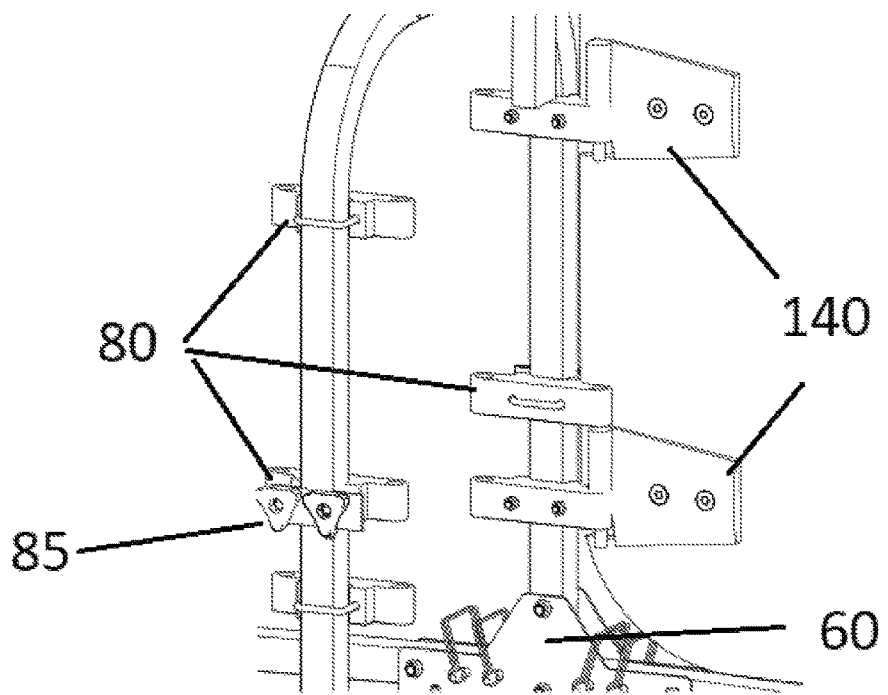
Figure 5:
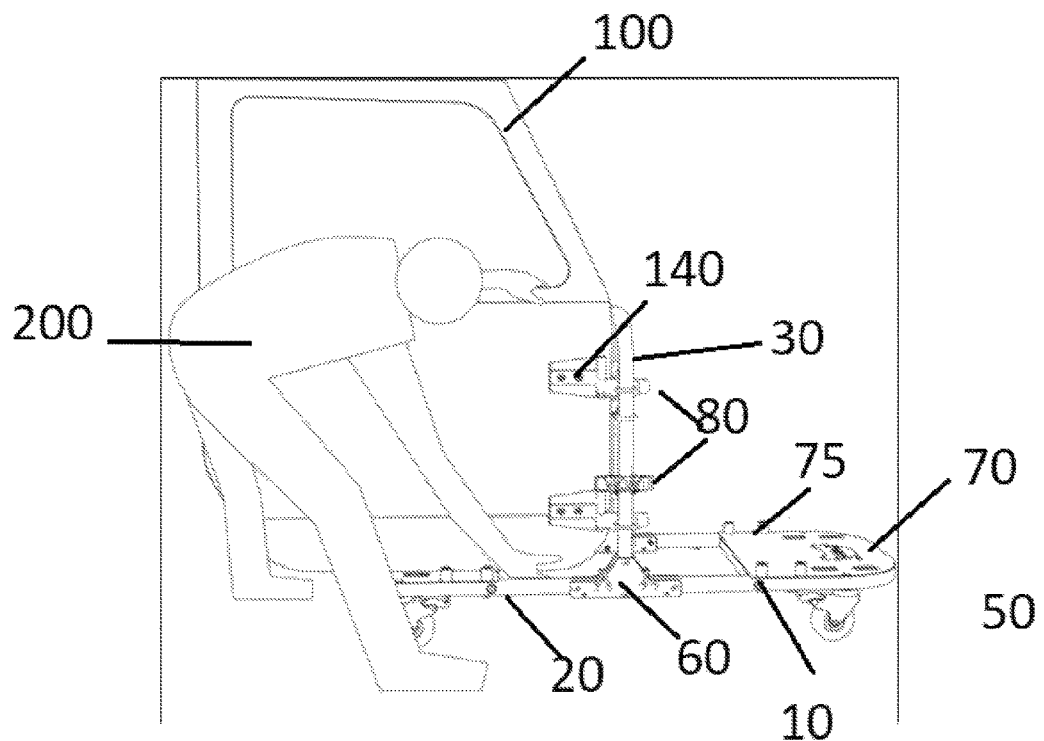
Figure 6:
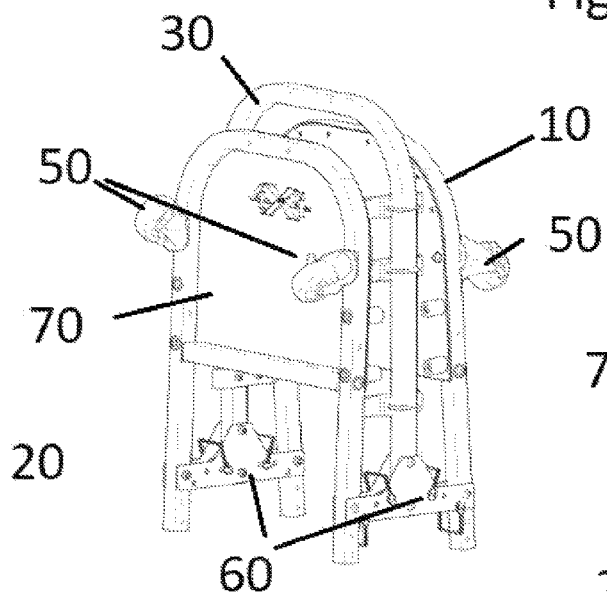
Figure 7:
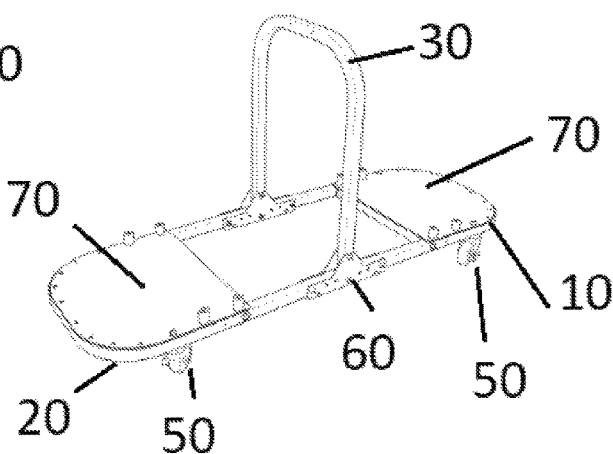
Figure 8:
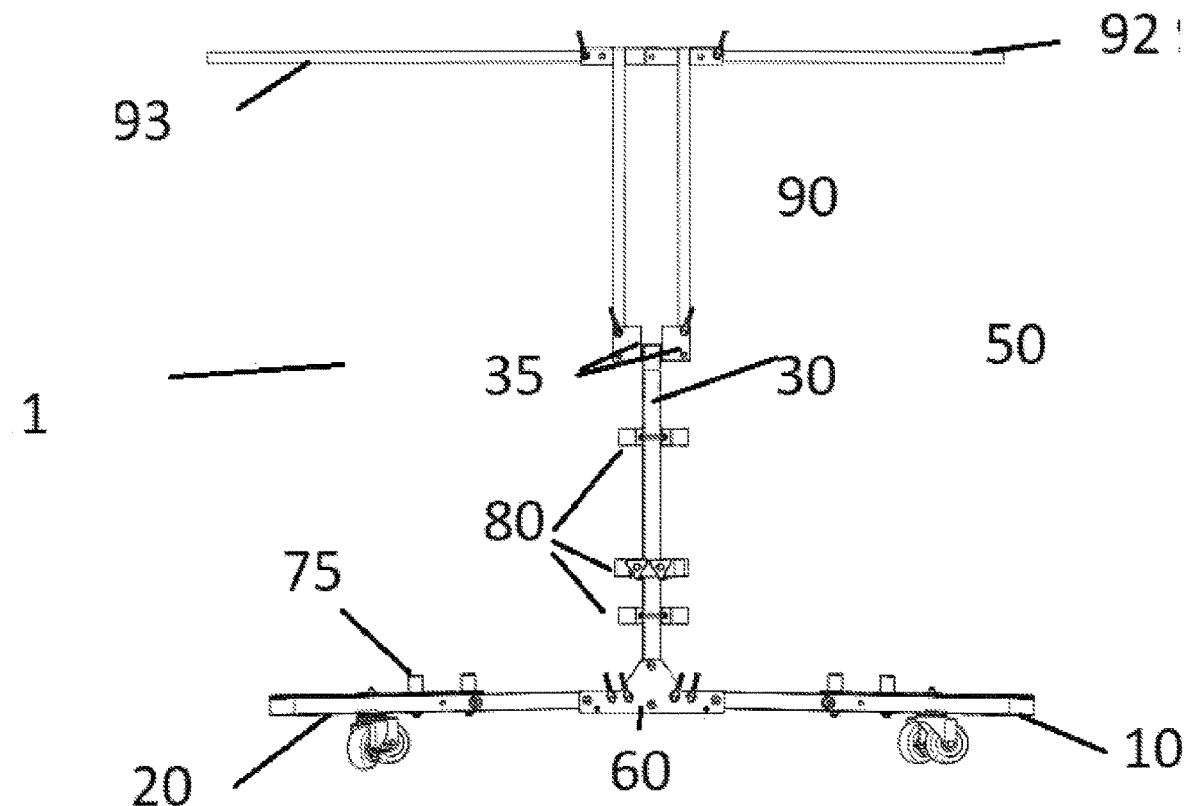
Figure 9:
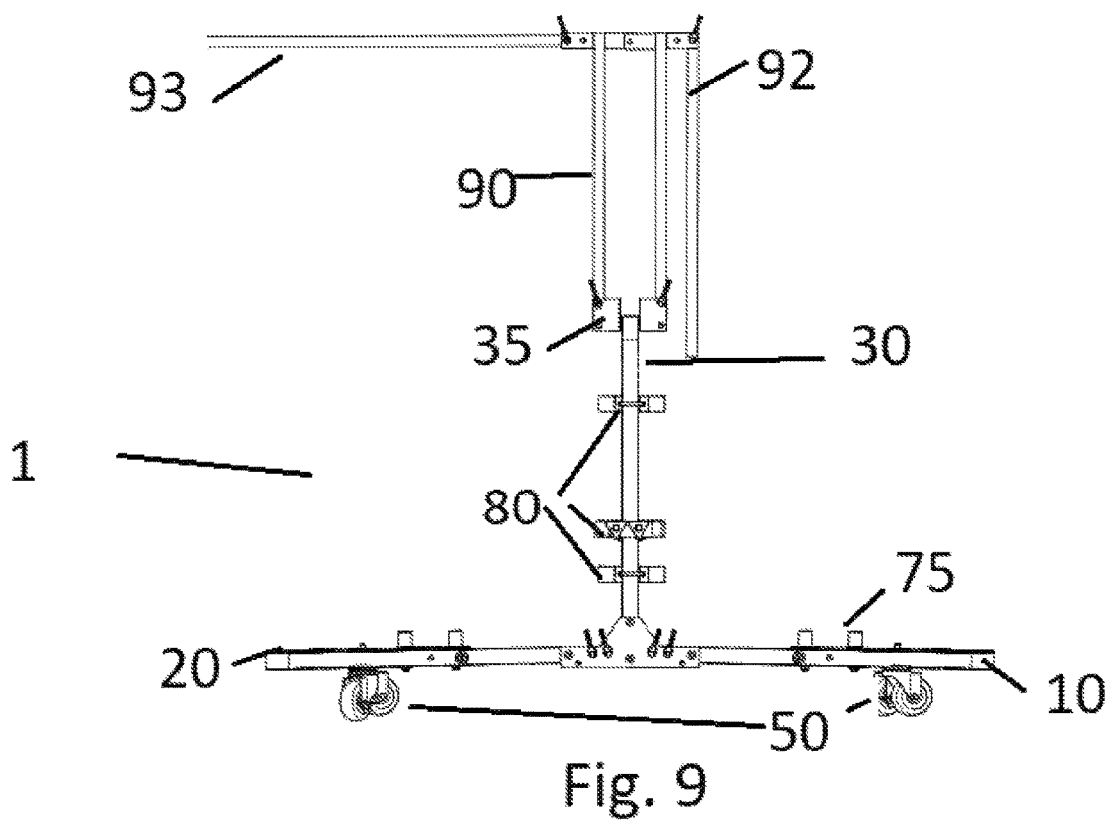
Figure 10:
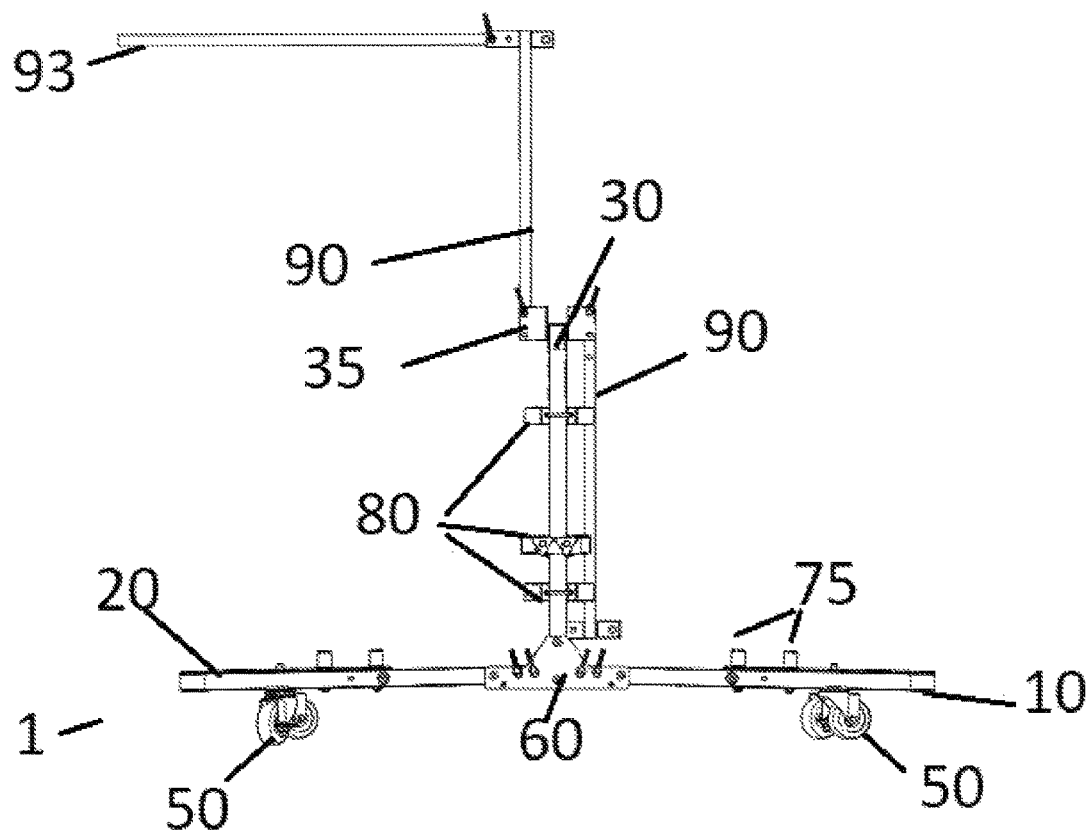
Figure 11:
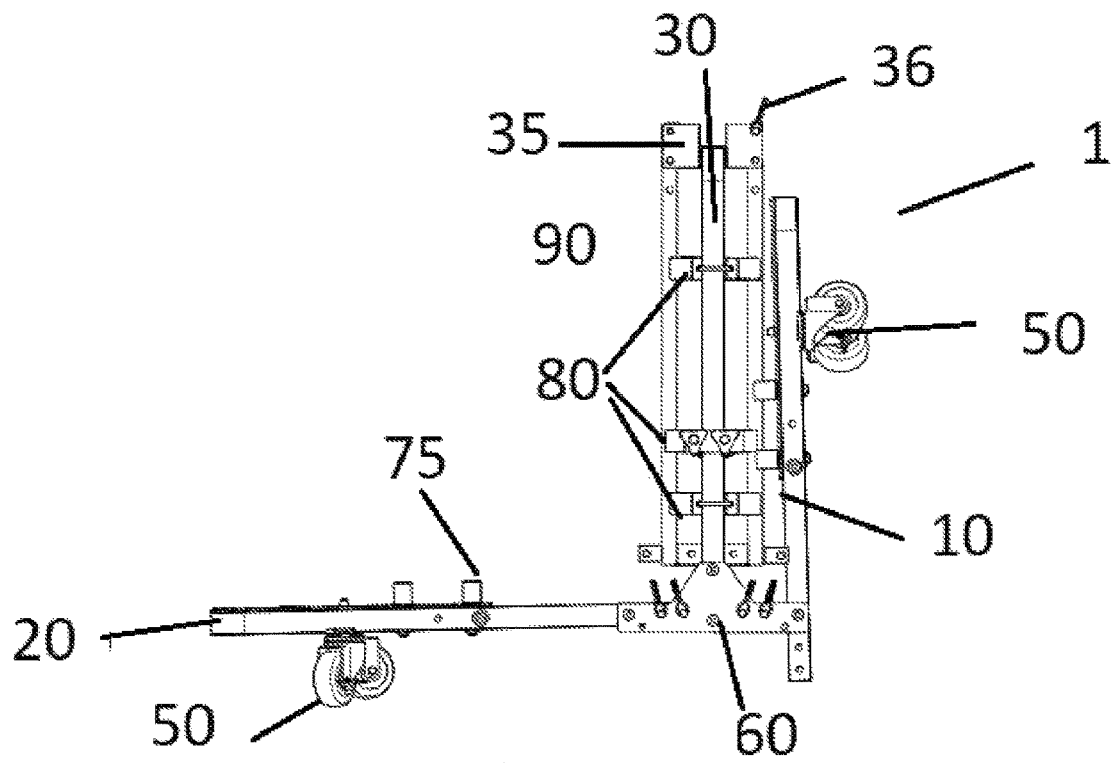
Figure 12:
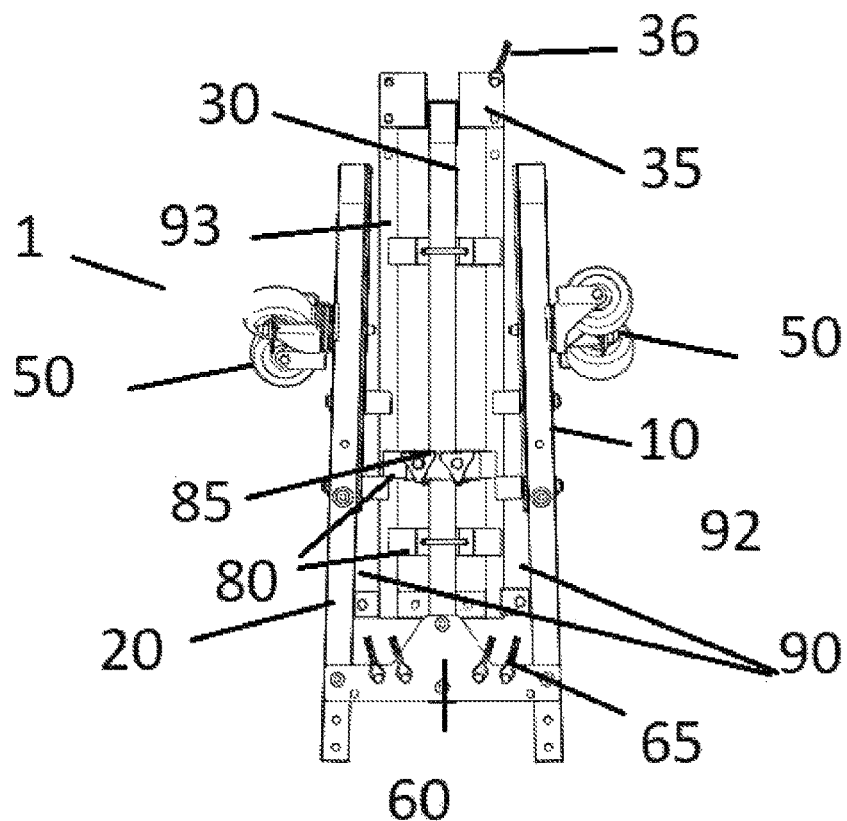
Figure 13:
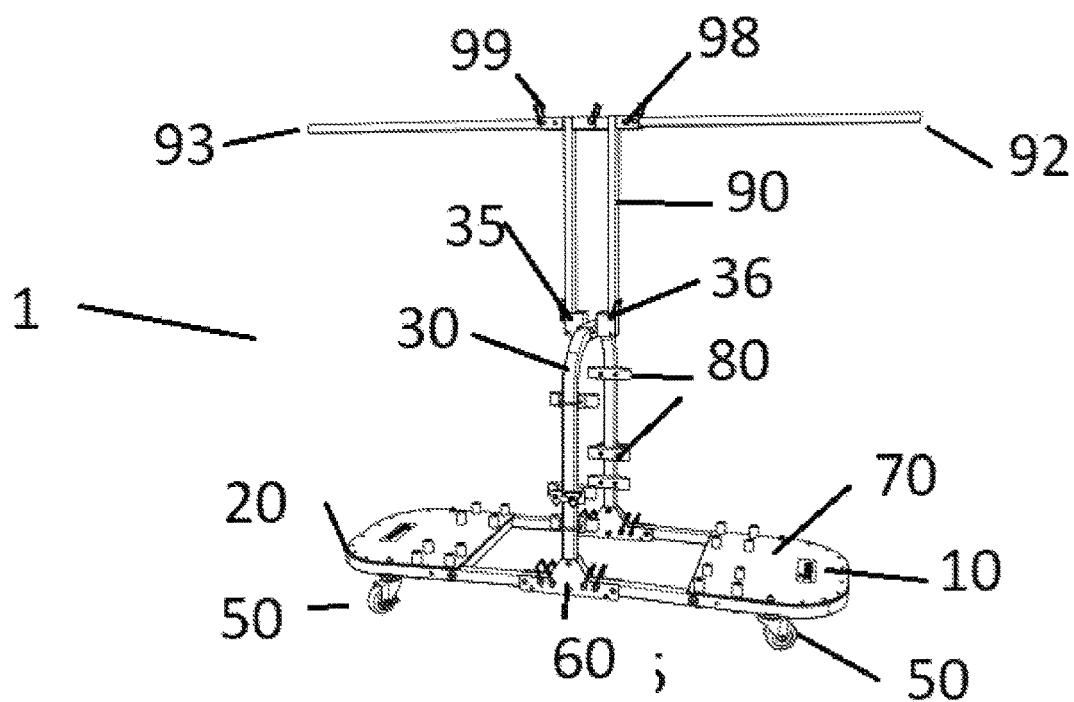
Figure 14:
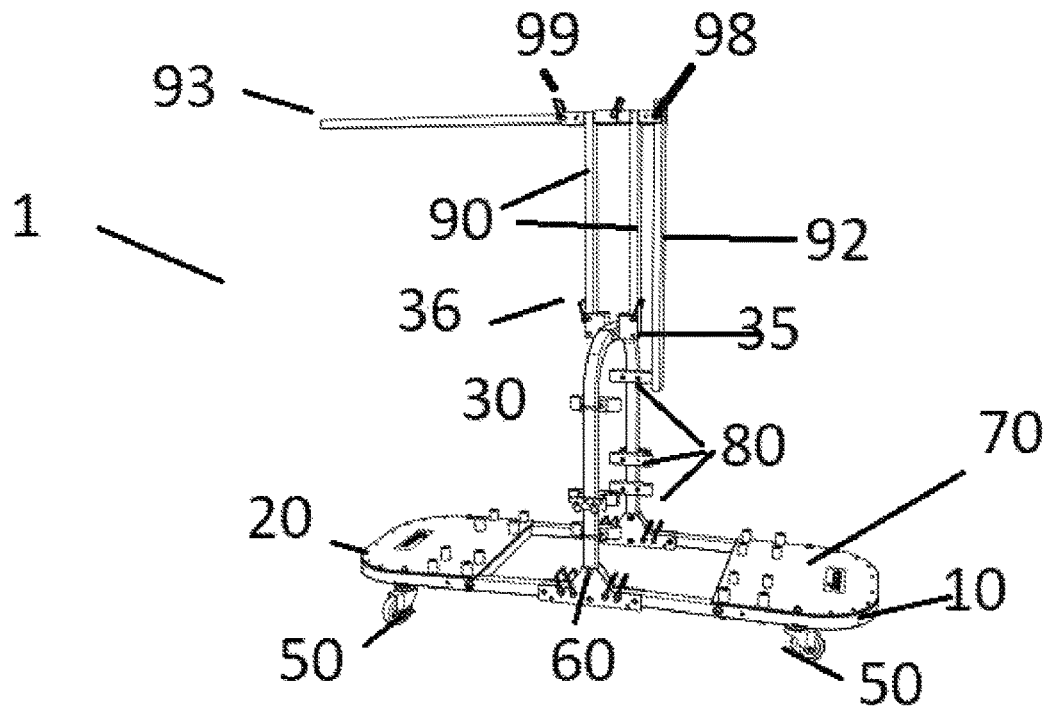
Figure 15:
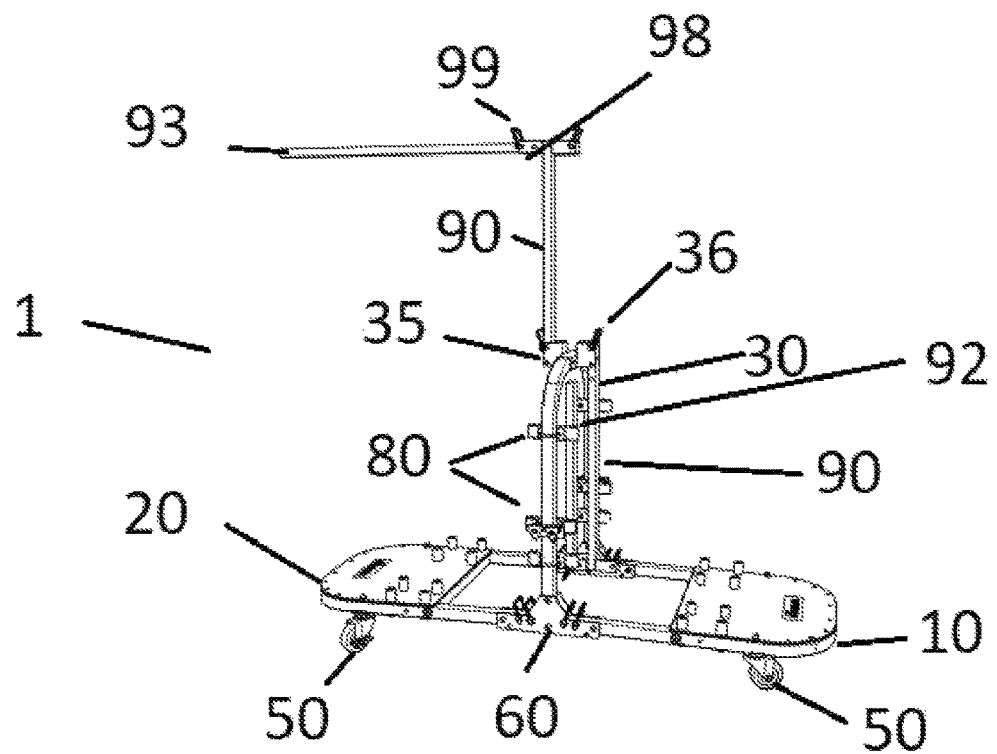
Figure 16:
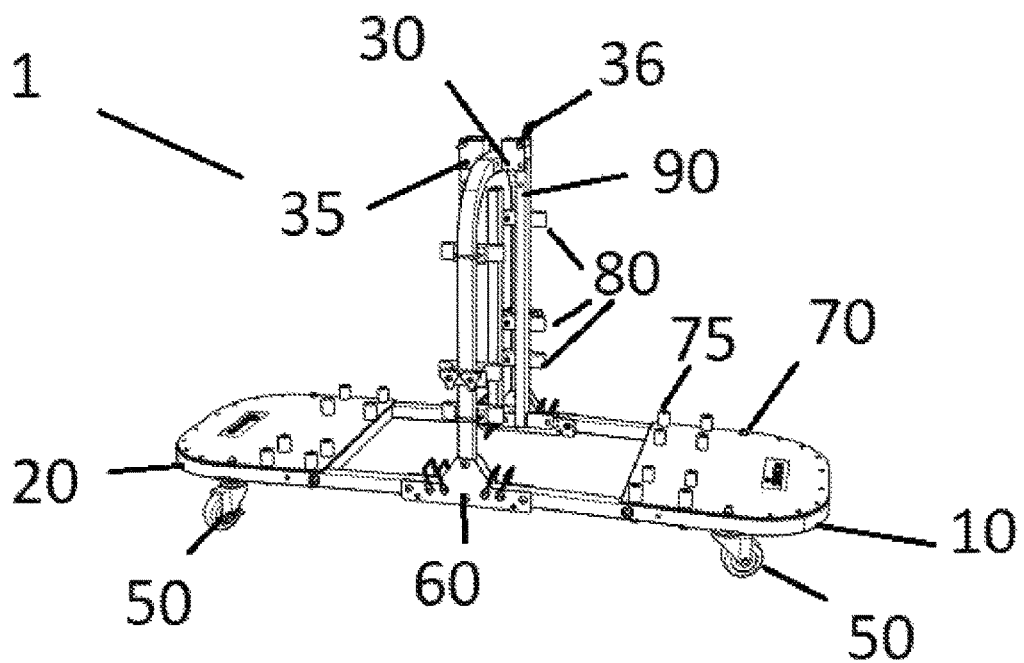
Figure 17:
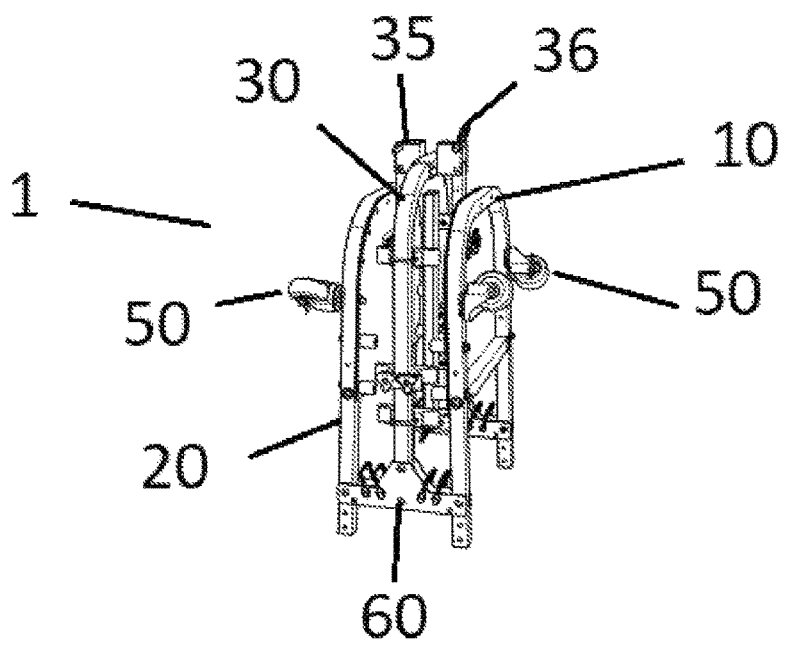
Figure 18:
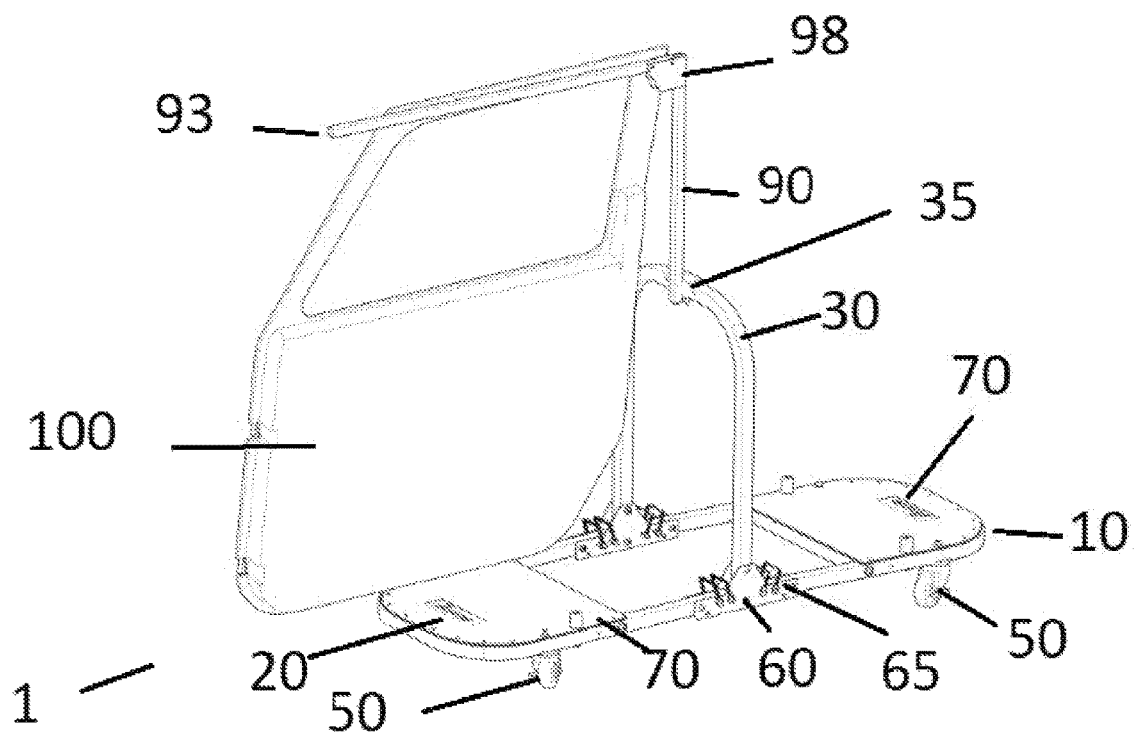
Figure 19:
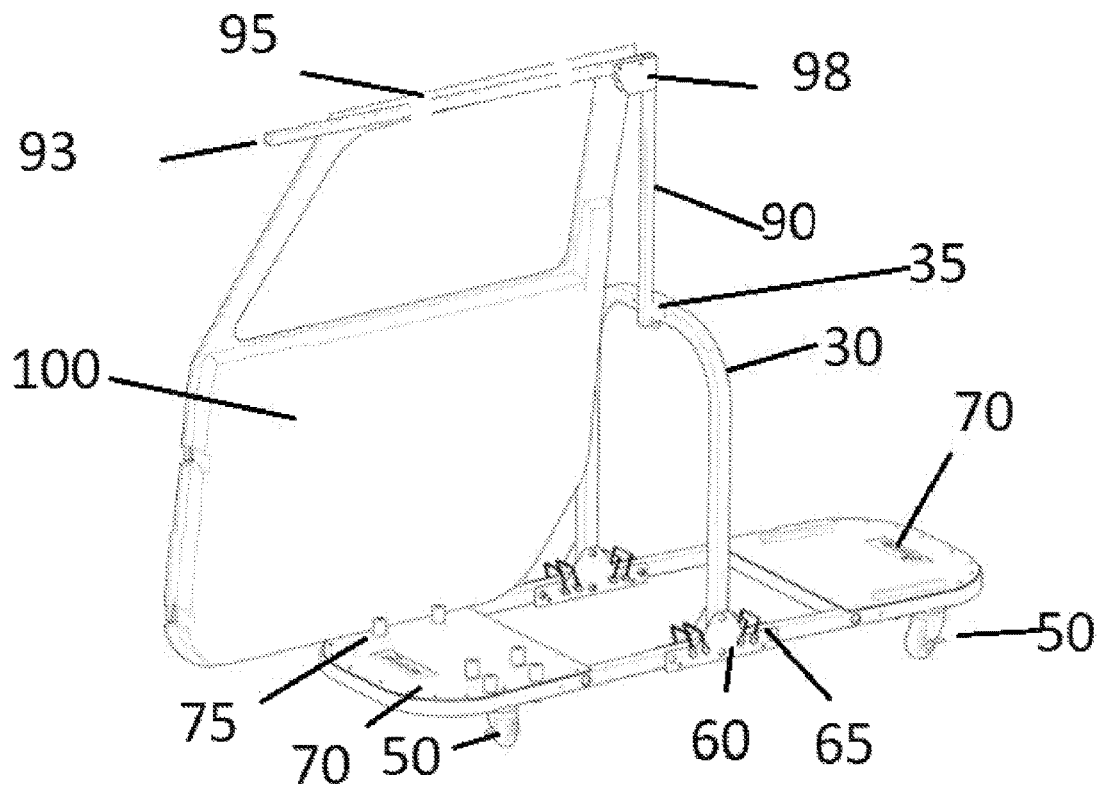
Figure 20:
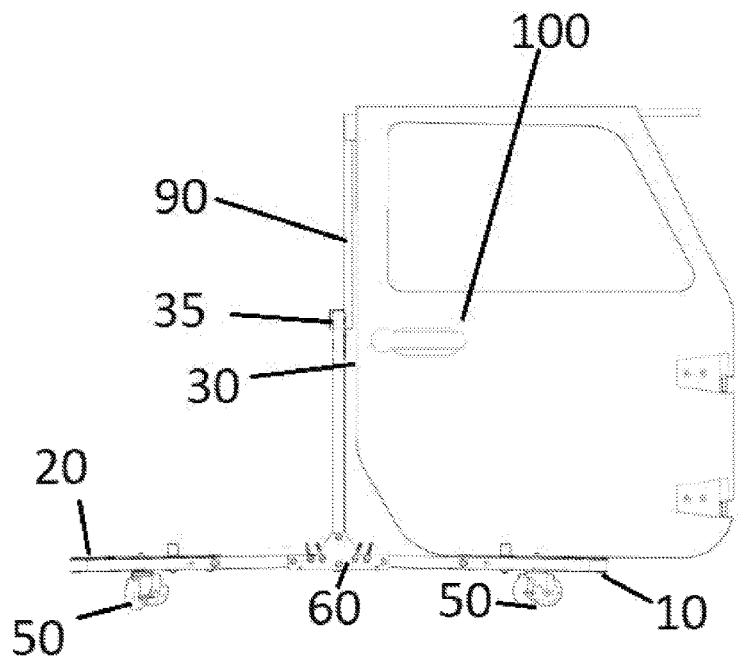
Figure 21:
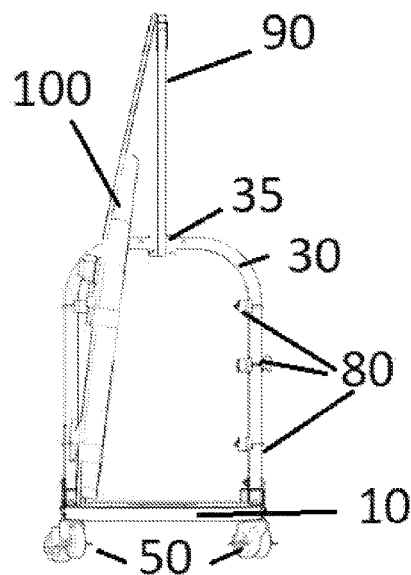
Figure 22:
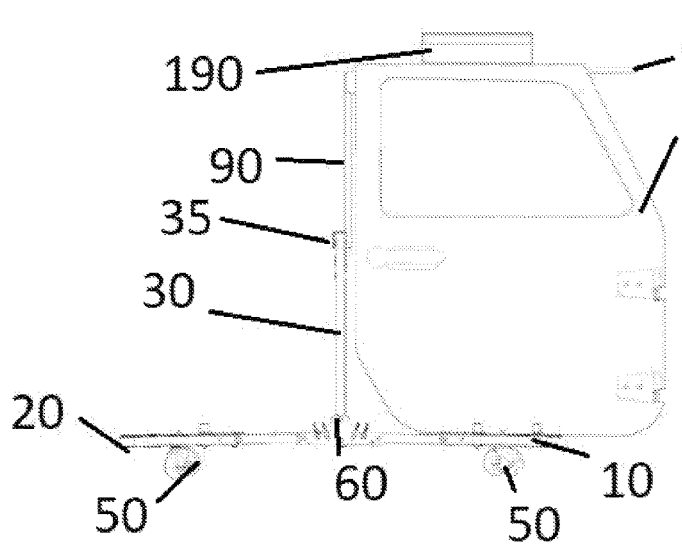
Figure 23:
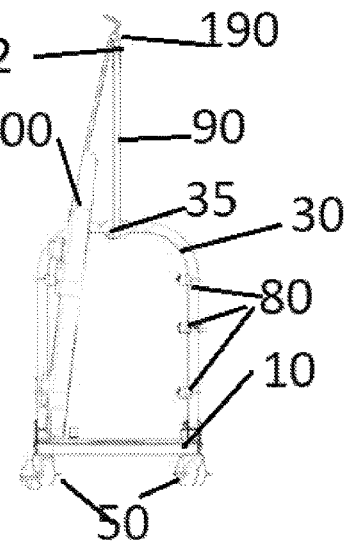
Figures 24, 25:
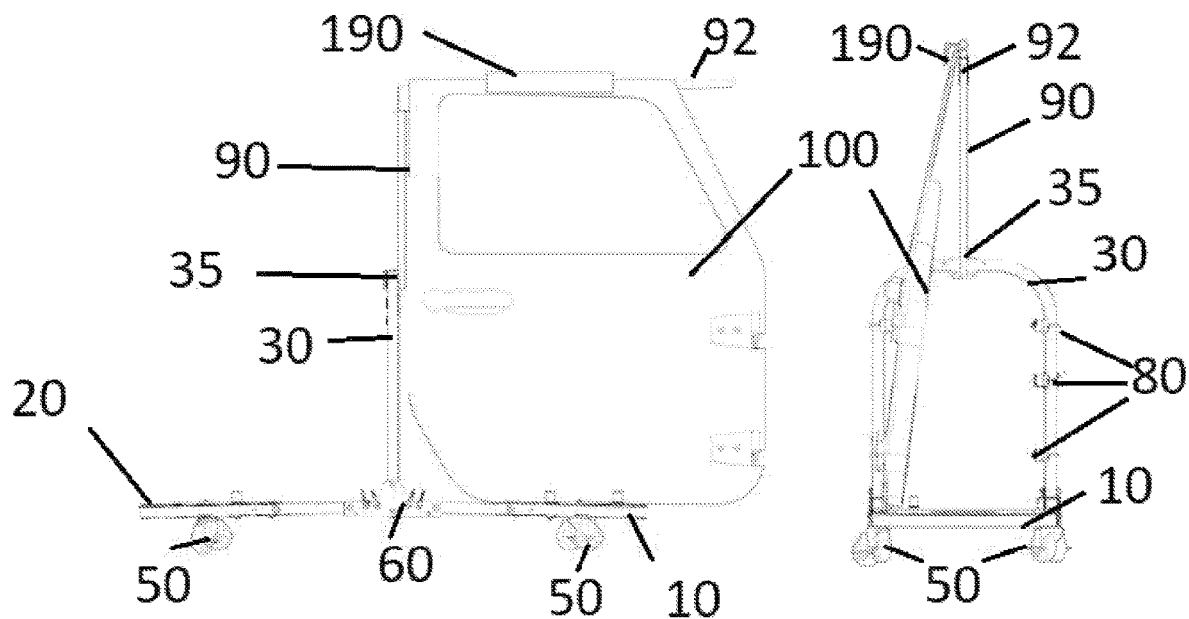
Figure 26:
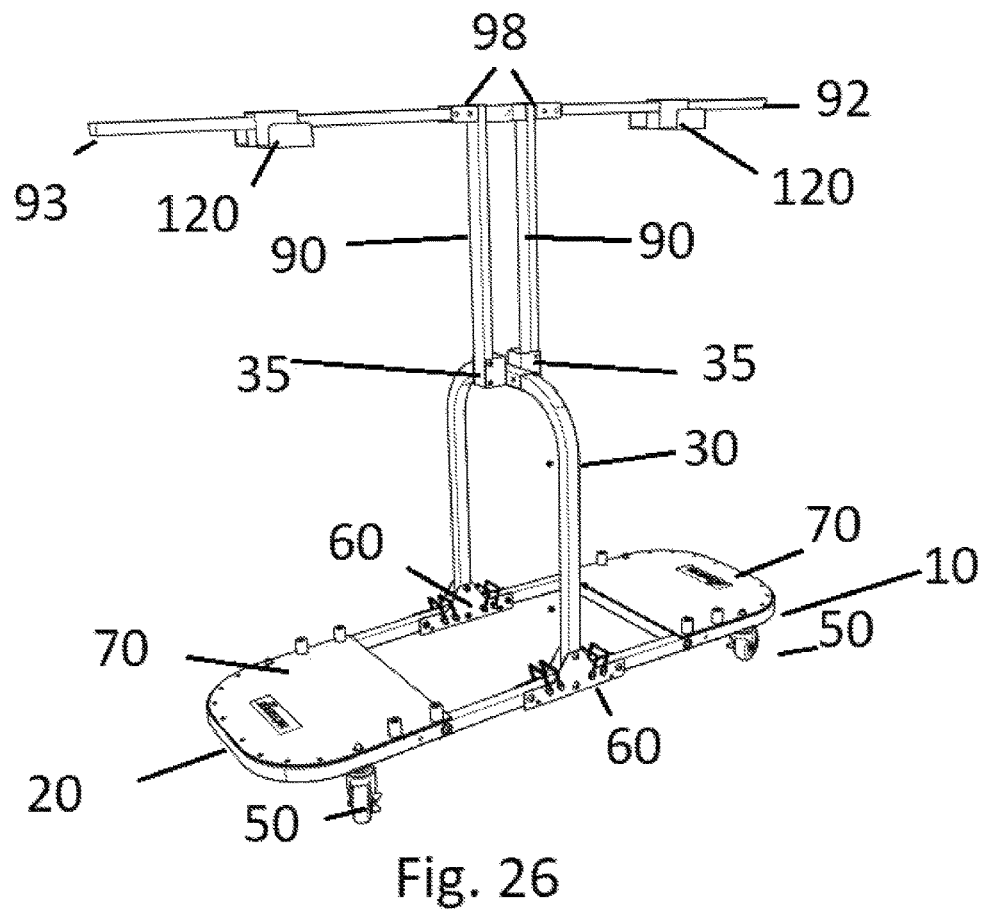
Figure 27:
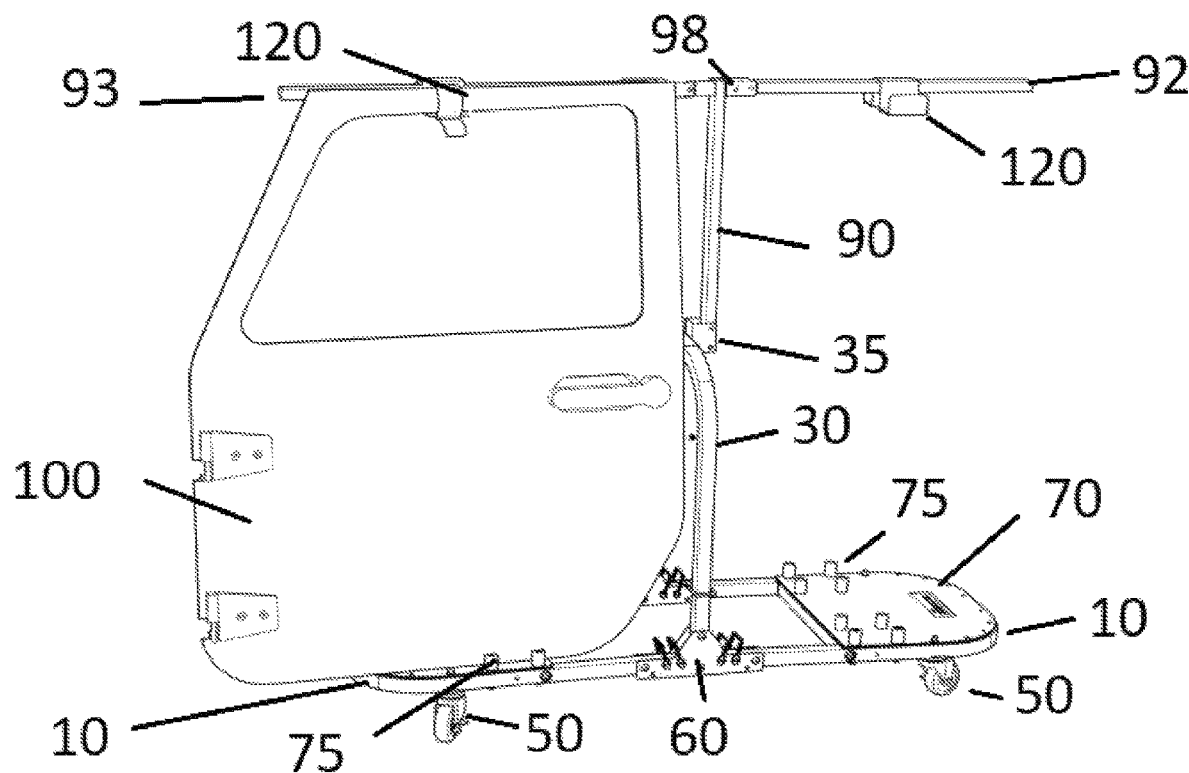
Figure 28:
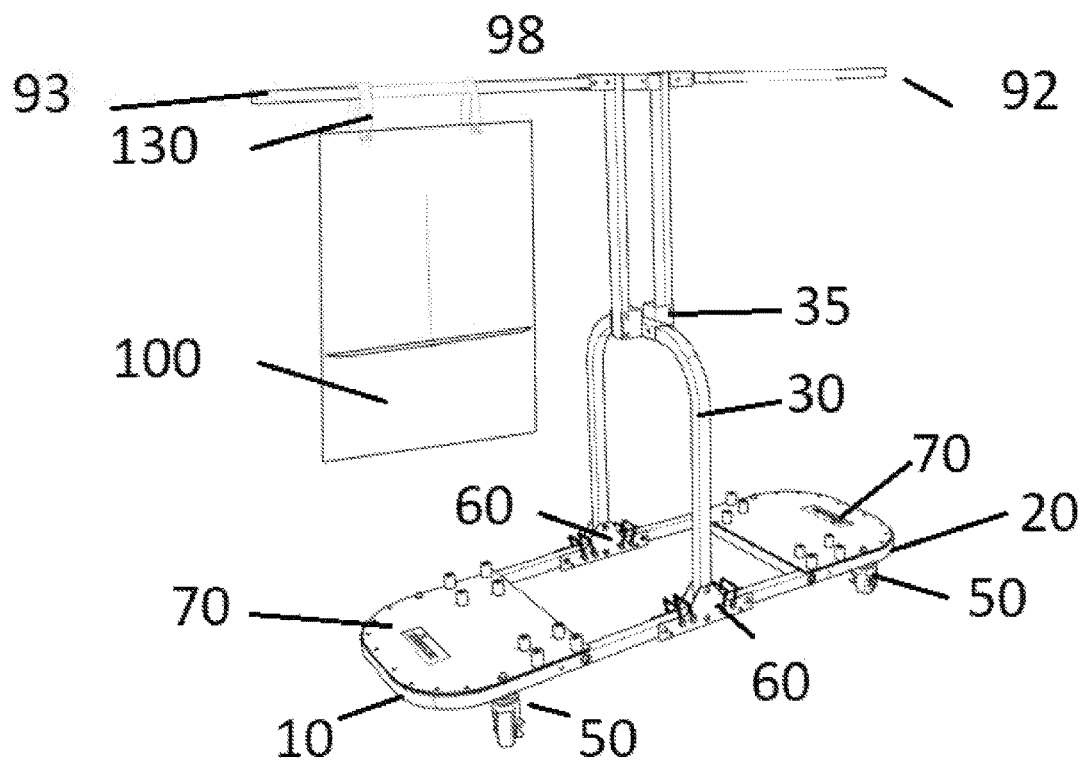
Figure 29:
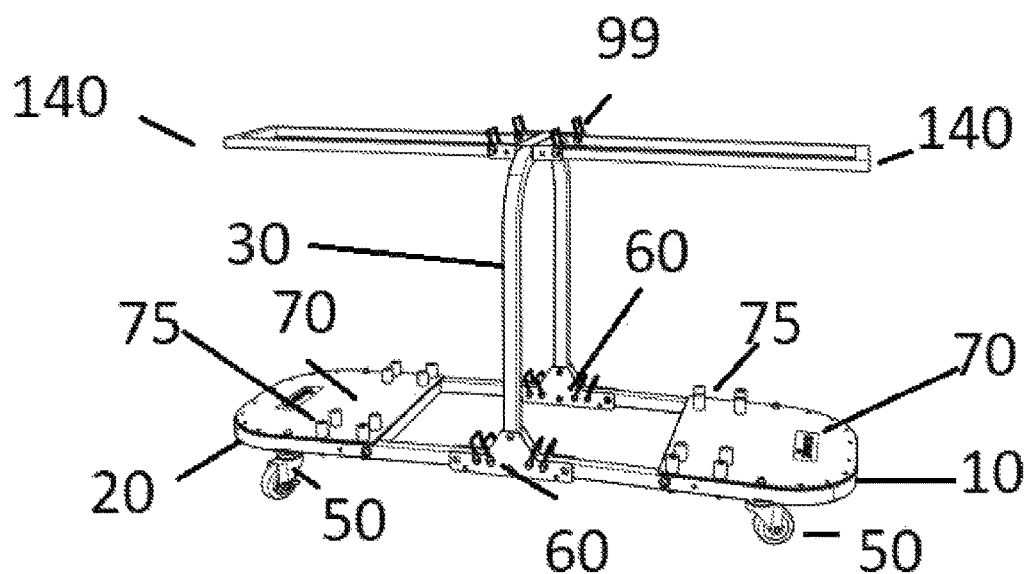
Figure 30:
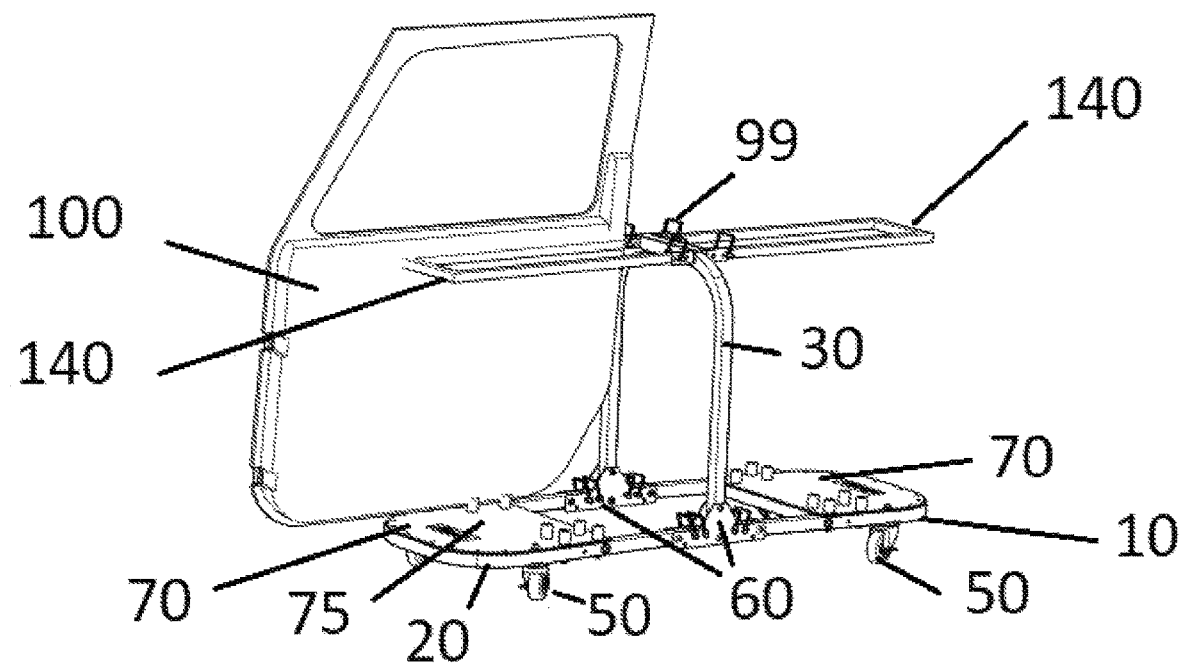
Figure 31:
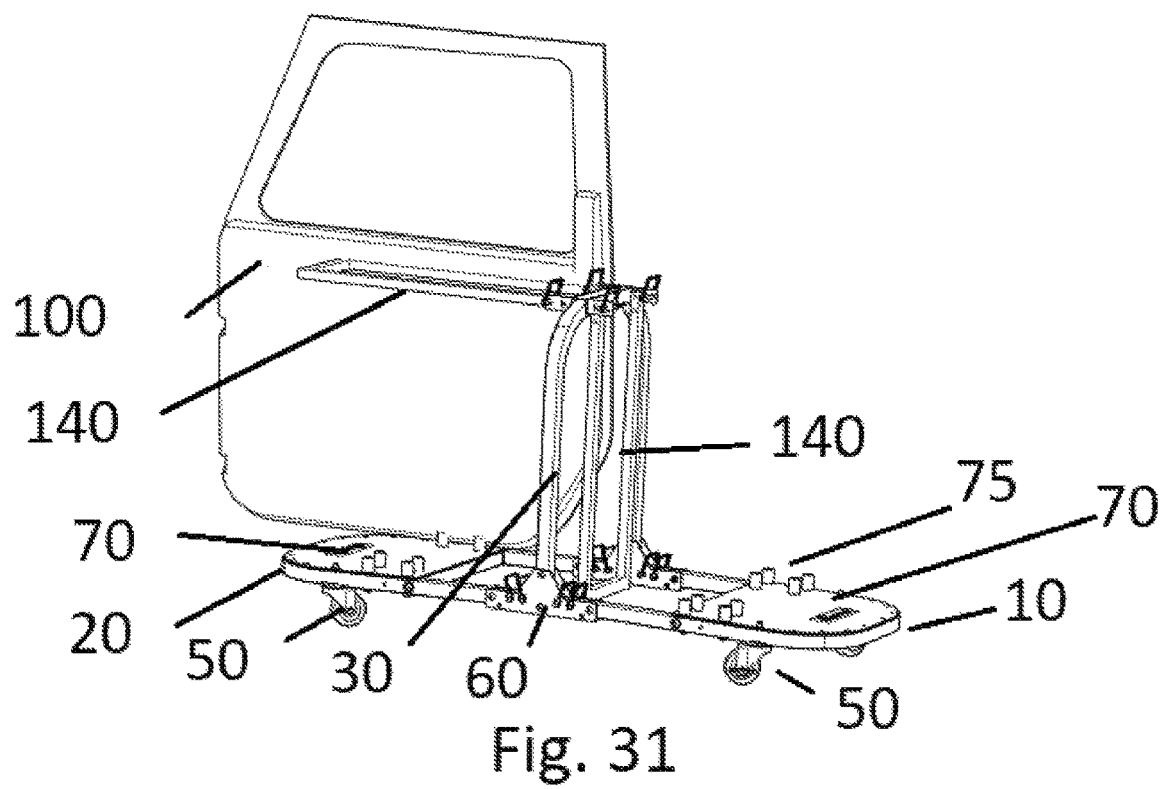
Figure 32:
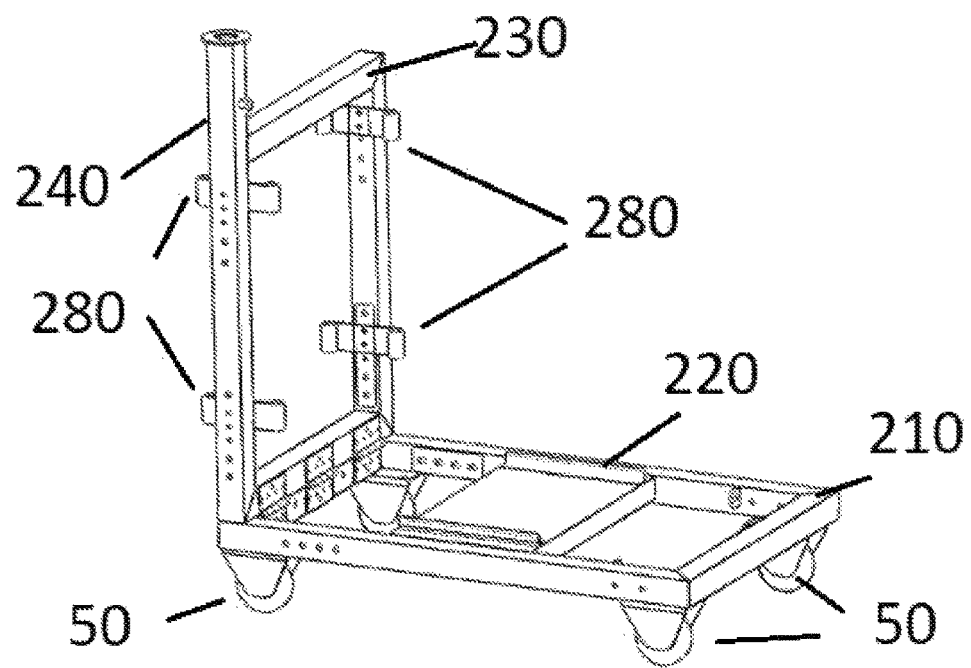
Figure 33:
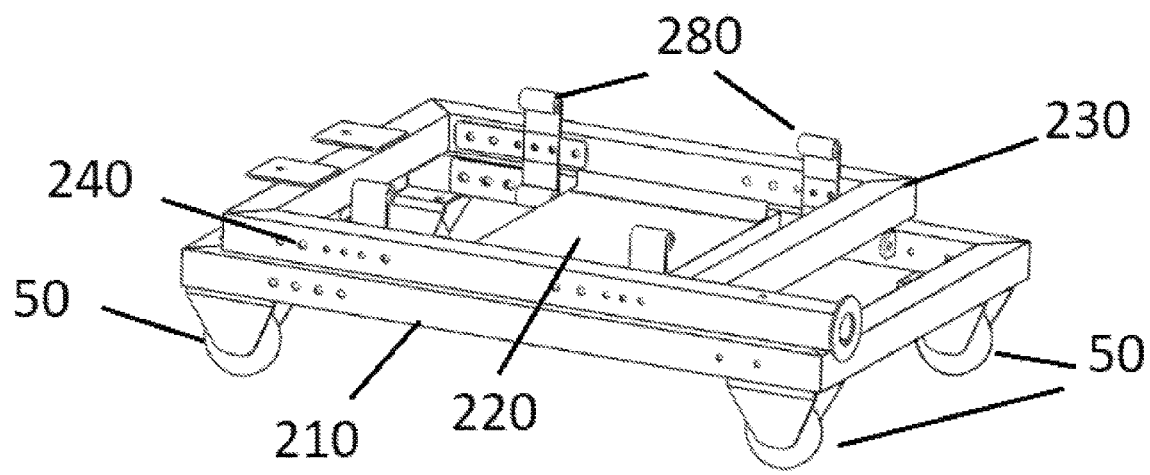
Figure 34:
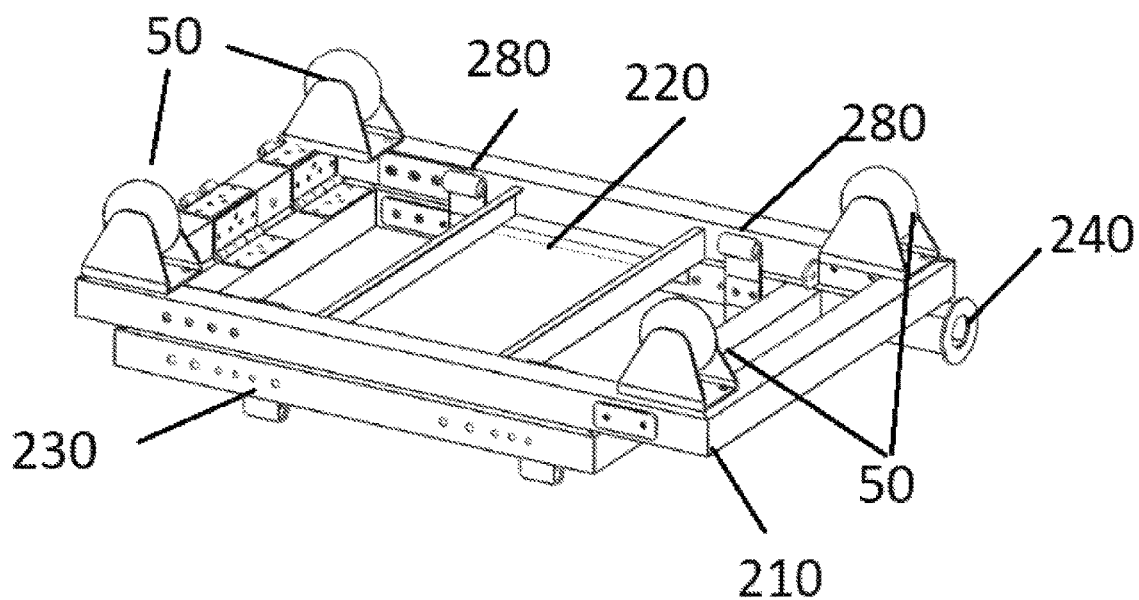
Figure 35:
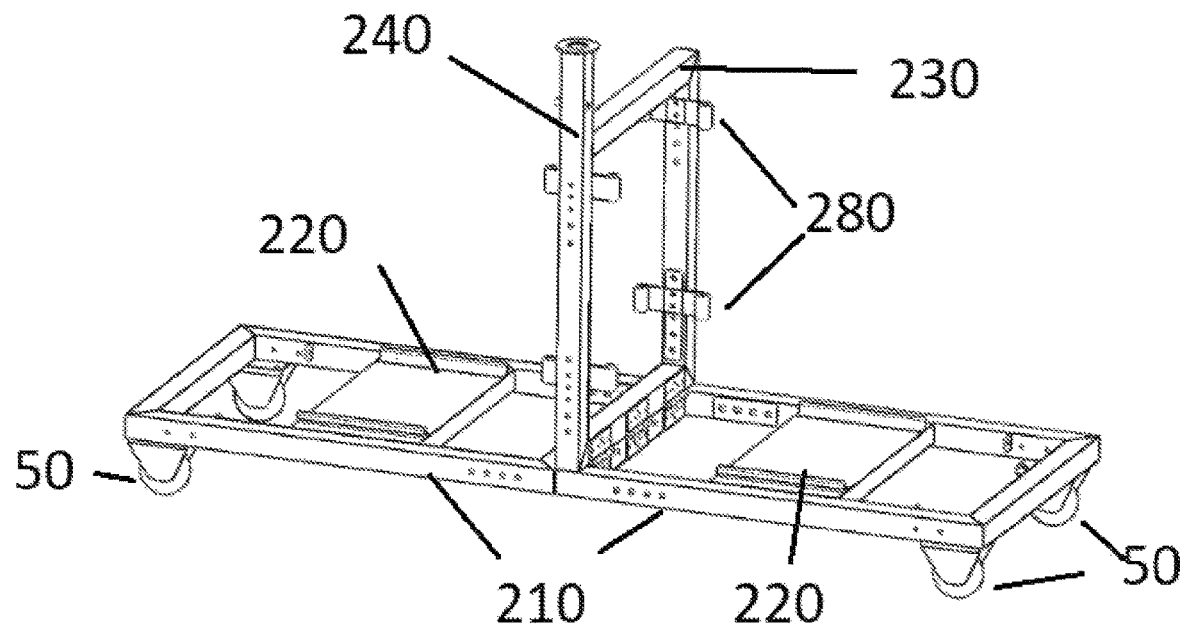
Figure 36:
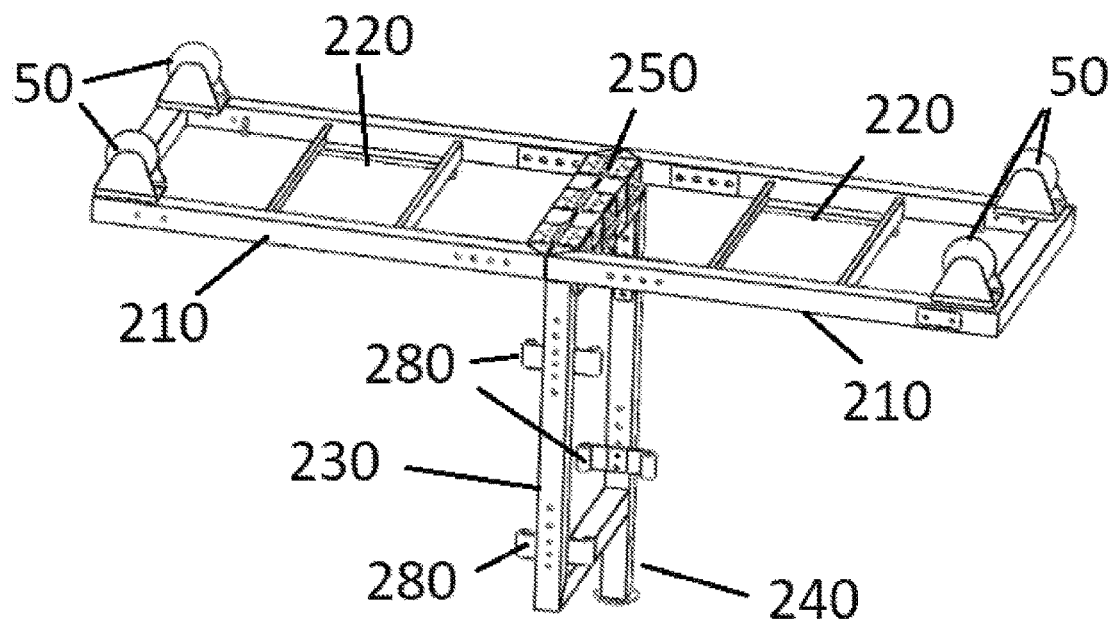
Figure 37:
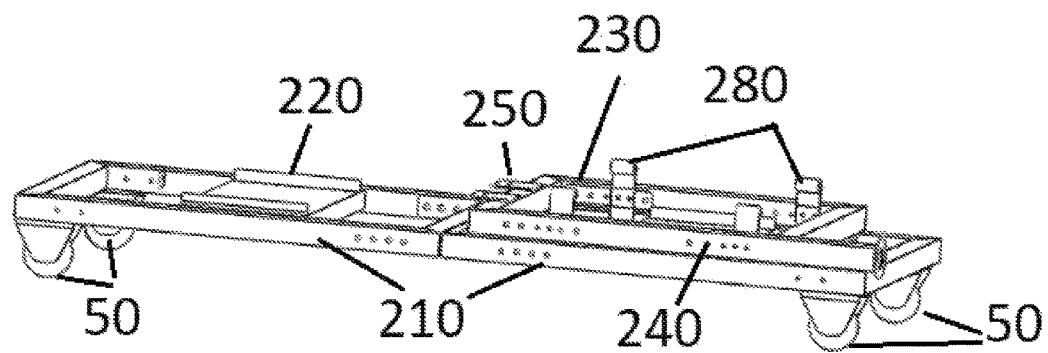
Figure 38:
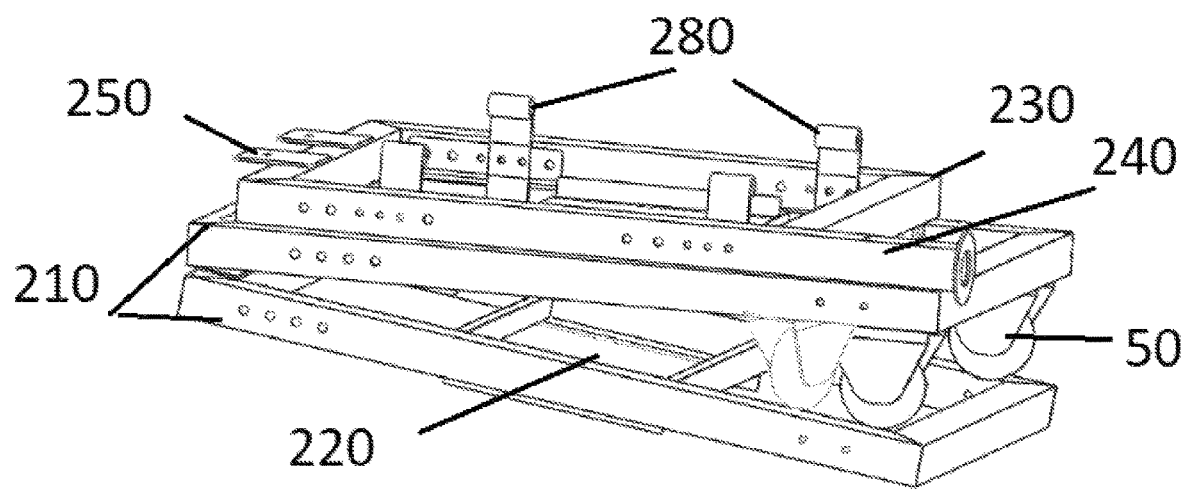
Figure 39:
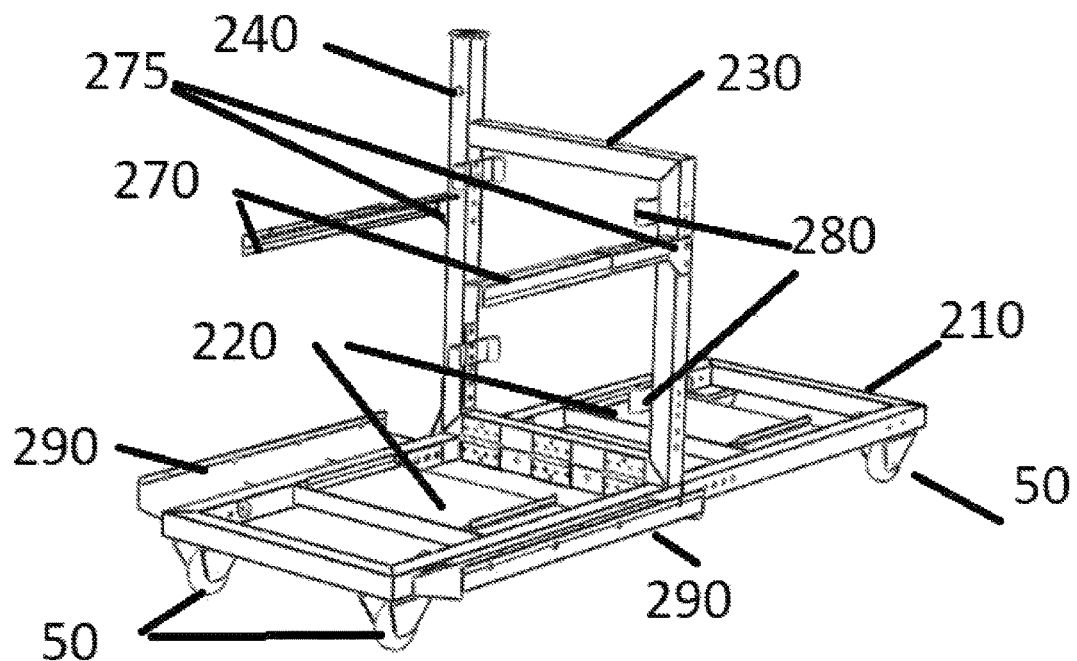
Figure 40:
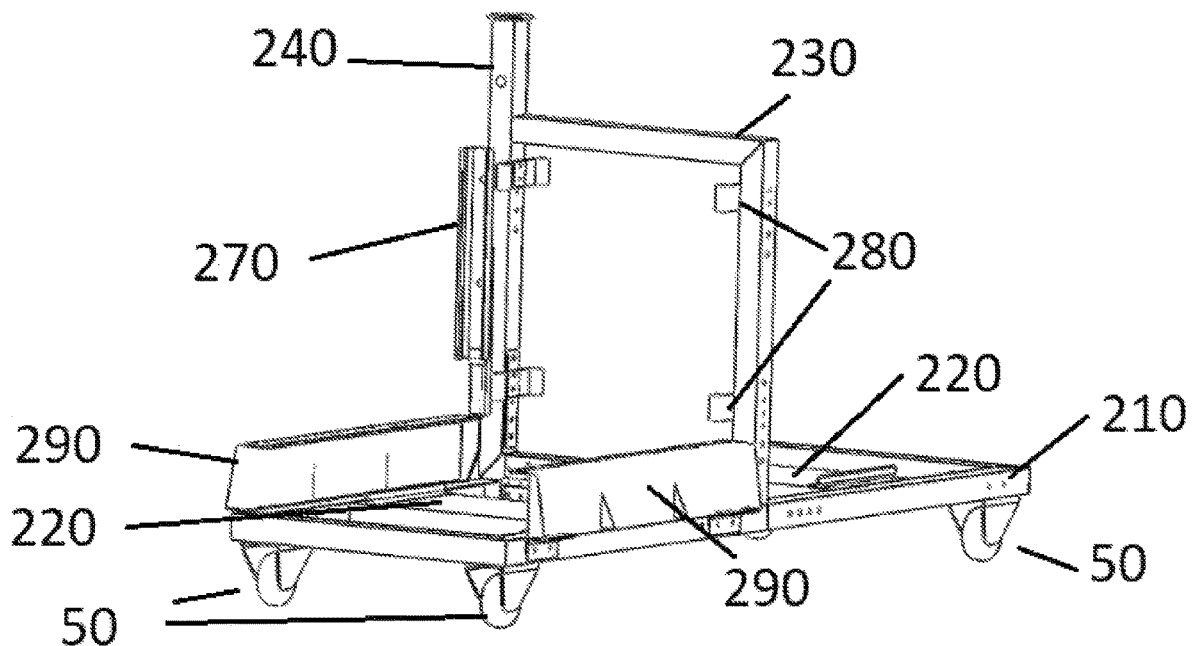
Figure 41:
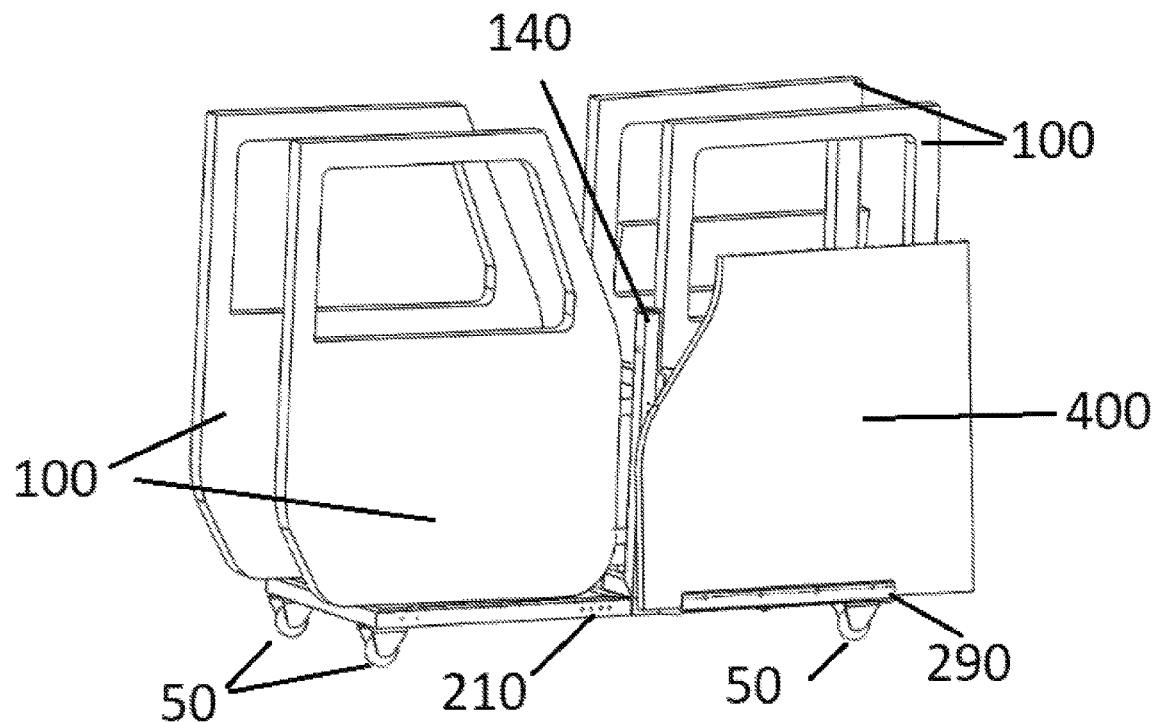
Figure 42:
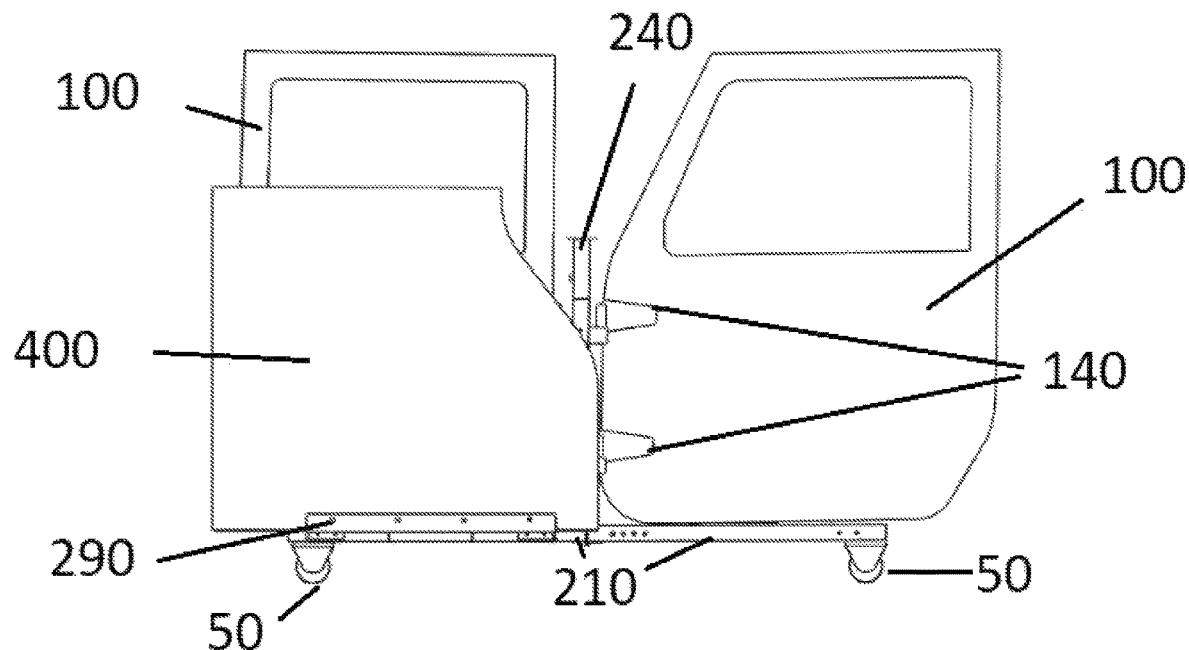
Figure 43:
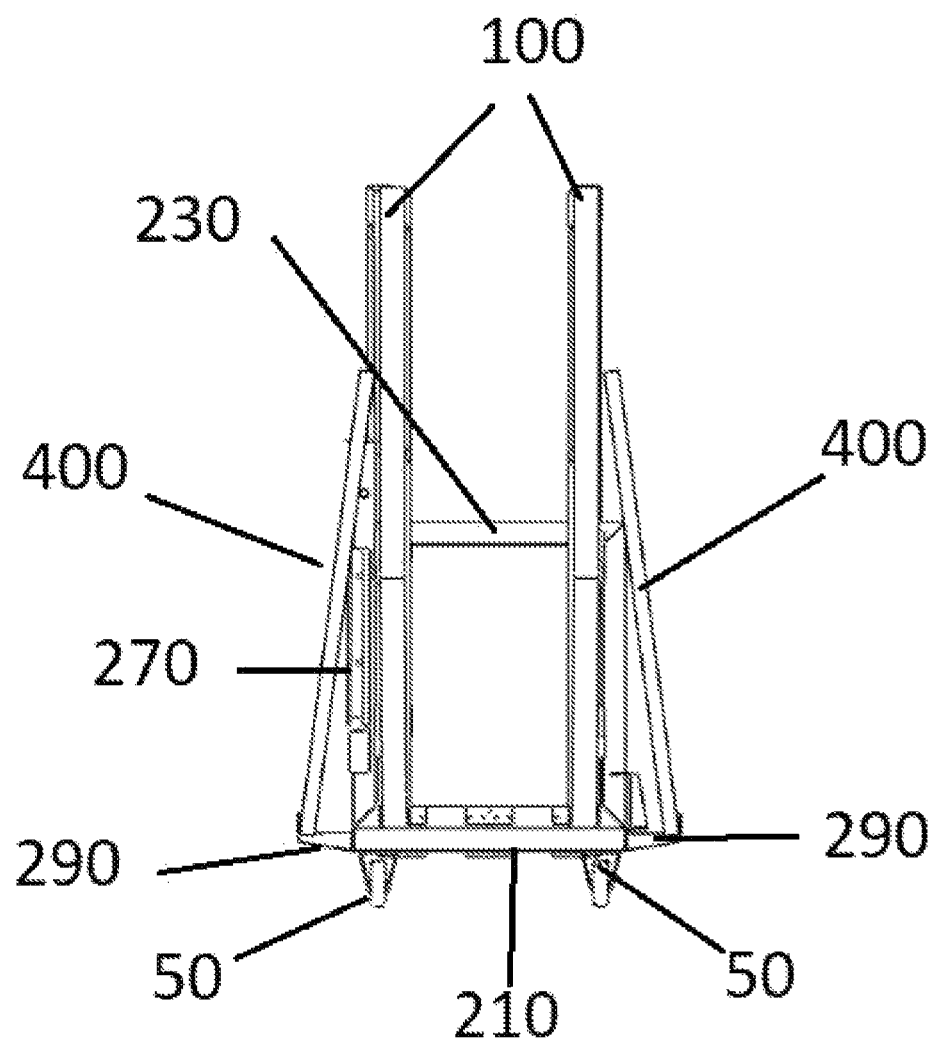

FIG. 1 is a display of one embodiment of a door holder.
FIG. 2 shows another angle of the door holder.
FIG. 3 shows a close view of the door frame being attached to the holder by the hinges.
FIG. 4 shows the adjustable brackets of the door holder.
FIG. 5 shows a person attaching a door frame to the door holder showing the space that allows a hand to fit below the door.
FIG. 6 shows the door holder in a folded position.
FIG. 7 shows the door holder cart unfolded.
FIG. 8 displays a side view of another embodiment of the door holder.
FIG. 9 shows the door holder with one of the supports folded in a downward position.
FIG. 10 shows one side of the door holder completely collapsed against the support bar which is connected to the base.
FIG. 11 is view of both of the bars folded against the base.
FIG. 12 shows the door holder folded completely.
FIG. 13 shows a top view of the door holder showing the door guides the extend up from the base to hold the door in the proper position.
FIG. 14 shows the door holder with one of the bars extended.
FIG. 15 shows the embodiment folded completely.
FIG. 16 shows both bars folded against the support base.
FIG. 17 shows to jeep door cover.
FIG. 18 shows a jeep door frame being held by the door frame holder.
FIG. 19 shows the jeep door frame with straps attaching it to the bar.
FIG. 20 shows a side view of the jeep door frame holder.
FIG. 21 shows a front view of the jeep door frame holder.
FIG. 22 shows a side front view of the jeep door frame holder with a 90 degree angle latch at the top of the bar.
FIG. 23 shows a front view with the 90 degree angle latch.
FIG. 24 shows a side view with the 90 degree angle latch closed over the door frame.
FIG. 25 shows a front view of the 90 degree angle latch closed over the door frame.
FIG. 26 show another embodiment with door hangers on the bars.
FIG. 27 shows a side view of a door frame hanging on a door hanger.
FIG. 28 shows a bag hanging from the one of the bars.
FIG. 29 shows an embodiment with a rectangular shaped double bar.
FIG. 30 shows a door frame being held by the embodiment of FIG. 29.
FIG. 31 shows another view of a door frame being held.
FIG. 32 shows another the door frame holder embodiment with one half being folded.
FIG. 33 shows it with both halves being folded.
FIG. 34 shows the bottom view of the folded door frame holder cart.
FIG. 35 shows the door frame holder expanded.
FIG. 36 shows the bottom of the door frame holder.
FIG. 37 shows the door frame holder with the support structure folded.
FIG. 38 shows the door frame holder folded with the wheels in.
FIG. 39 shows a door frame holder with side bars and trays at the sides.
FIG. 40 shows the tray folded in.
FIG. 41 shows the door frame holder holding four doors and the cut out.
FIG. 42 shows a different view of FIG. 41.
FIG. 43 shows a front view of FIG. 41.

DETAILED DESCRIPTION

The illustrations presented herein are, in some instances, not actual views of any particular framing devices or components thereof, but may be idealized representations which are employed to describe the present disclosure. Additionally, elements common between figures may retain the same numerical designation.

FIGS. 1 through 43 shows a number of embodiments for a foldable door frame holder cart.

FIGS. 1 and 2 shows an embodiment of the device 1 which is foldable door frame holder cart. The device 1 has a rounded support bar 30 in the middle of a base which in the preferred embodiment is comprised of two halves, a left half 20 and right half 10. The base 10. 20 has a plurality of wheels 50 attached to the bottom of the base and evenly spaced in the preferred embodiment. The device 1 has a plurality adjustable brackets 80 which the hinges 140 of the door frame 100 fit into. FIG. 3 shows an adjustable bracket such as a thumb-turn bracket 85 which can be used to better secure the door frame 100 to the device 1. FIGS. 3 and 4 show a closer view of the brackets 80 holding the door frame 100.

Each half 10, 20 will have a flat base 70 on its distal end. The distal ends will also be curved in the preferred embodiment with the halves being comprised of bars in the shape of a "U". The proximate ends for the halves will connect to a hinged bracket 60. The hinged bracket 60 connects the left half 20 and the right half 10 together to form the base. The left half 20 and the right half 10 are secured by securing clasps 65.

The support bar 30 extends up from the base with a curved distal end and two ends that connect to the two hinged brackets 60.

FIG. 5 shows a person 200 placing the door frame 100 onto the adjustable brackets 80 of the support bar 30 displaying that the design is structured so that the persons fingers or hand will not get pinched. The door frame 100 is slide or place on the flat base 70 between a plurality set of door secure tabs 75 which extend up from the flat base 70 and are space apart with enough space for the door frame 100 to fit between them. The door secure tabs 75 help secure the door frame 100. The door secure tabs are either cover by or made of a soft material like rubber or plastic so the do not scratch the door frame 100.

The device 1 is foldable has shown in FIG. 6. The halves 10, 20 fold in towards the support bar 30 on hinged brackets 60. The proximate ends of the halves forming legs on which the device 1 can stand on.

FIG. 7 shows the device 1 without the door frame 100.

FIGS. 8 and 13 shows another embodiment with a "T" shape with the right foldable bar 92 and the left foldable bar 93 at the top of the device 1. Extension bars 90 extend perpendicular from the support bar 30. The extension bars 90 connect to the support bar 30 by a support bar hinge 36 and are held in place with a support bar clasp 36. At the distal end of the extension bar 90, the end that does not connect to the support bar 30, connects to the right foldable bar 92 and the left foldable bar 93 by extension bar hinges 98 and secured through extension bar clasps 99.

FIGS. 9 and 14 shows right foldable bar 92 folded while FIGS. 10 and 15 shows it and the extension bar 90 folded all the way to the support bar 30 along with the extension bar 90 it is connected to. The right foldable bar 92 folds on the extension bar hinge 98 and the extension bar 90 folds in on the support bar hinge 35. FIG. 11 shows both top bars folded and right half 10 of the base folded. FIG. 16 shows both tow bars 92, 93 and extension bar 90 folded.

FIGS. 12 and 17 has device 1 folded completely.

FIG. 18 shows a door frame 100 held by the device 1. The door frame 100 leaned against the left extension bar 93, FIG. 19 shows the door frame 100 held by straps 95 with the door frame 100 positioned between the set of door secure tabs 75. FIGS. 20 and 21 show a side and top view of this device 1 with the straps 75.

The device 1 could also have a latching system 190 as shown with an open clamp in FIGS. 22 and 23 and closed in FIGS. 24 and 25 where a latch 190 is connected to one of the extension bars 92, 93 and is rotated on a rotation means such as hinges to hold the door frame 100 in place.

FIG. 26 shows the device 1 with double hooks 120 on each of the extension bars 92, 93. The door frames 100 are attached to these hooks and secured by straps as shown in FIG. 27. A smaller door frame 100 can be attached using extended straps 130 to the extension bars 92, 93 as shown in FIG. 28.

FIGS. 29, 30 and 31 show the device 1 with a rectangular top bar 140 the attaches to the support bar 30. FIG. 30 shows the a door frame 100 attached to this embodiment of the device 1. FIG. 31 shows the rectangular top bar 140 folded into the support bar 30 using a folding means like a hinge.

FIGS. 32 through 34 show an embodiment of the device 1 with a single sided embodiment. This embodiment has a rectangular base 210 with a base shelf 220 connected to the two longer sides of the base 210. A support frame 230 is connected to and extends perpendicular from the base 210. A extended support bar 240 is part of the support frame 230 and extends out from the support frame 230. The internal sides for the support frame 230 had mounting brackets 280. This embodiment is foldable as shown in FIGS. 33 and 34.

This embodiment can have the base 210 formed by two halves as shown in FIGS. 35 through 43 with the two halves foldable using a hinging means 250.

FIGS. 39 through 43 show the two sided embodiment with a side bar 270 connected to the side of the support frame 230 by side bar hinges 275. The side bars 270 extend perpendicular from the support frame 230 and are used to support the door frames 100. The device 1 can also have side support clasps 290 that are connected to the top side of the base 210. The side support clasps 290 fold out from the base 210 hold the door frames 100 so they are positioned securely against the side bars 270 as shown in FIGS. 41 through 43. The device 1 can also hold vehicle panels 400.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art.

What is claimed is:

1. A foldable door cart comprising:
    a base, wherein the base consists of a left half and a right half connected by two hinged brackets;
    a support bar positioned in a middle of the base between the left half and the right half and attached to the two hinged brackets, wherein the support bar extends upwards from the two hinged brackets with a curved distal end and two proximal ends that connect to the two hinged brackets;
    a plurality of adjustable brackets mounted to the support bar for holding a door,
    a plurality of wheels that extend from a bottom of the right half and the left half;

wherein the left half and the right half fold inwards toward the support bar via the two hinged brackets, and wherein proximate the two hinged brackets two ends of each of the left half and the right half form legs for the cart to rest upon when the plurality of wheels attached to opposite ends of the left half and right half are folded upwards.

2. The foldable door cart according to claim 1, further comprising:

wherein the right half and left half are comprised of bars that are U-shaped.

3. The foldable door cart according to claim 1 further comprising:

where the right half and left half each have a flat base on its distal end.

4. The foldable door cart according to claim 3 further comprising:

the flat base having a plurality of door secure tabs.

5. The foldable door cart according to claim 1 further comprising:

wherein at least one of the adjustable brackets is a thumb-turn bracket.

6. The foldable door cart according to claim 1 further comprising:

having the left half and the right half secured by securing clasps.

7. The foldable door cart according to claim 1, further comprising:

a right foldable bar and a left foldable bar connected to the support bar.

8. The device according to claim 1 further comprising:

having a plurality of extension bars connected to the support bar by a support bar hinge.

9. The foldable door cart according to claim 8, further comprising:

a foldable bar connected to one of the plurality of extension bars.

* * * * *